(12) United States Patent
Pivac

(10) Patent No.: US 11,951,616 B2
(45) Date of Patent: Apr. 9, 2024

(54) POSITION AND ORIENTATION TRACKING SYSTEM

(71) Applicant: FASTBRICK IP PTY LTD, High Wycombe (AU)

(72) Inventor: Mark Joseph Pivac, Lesmurdie (AU)

(73) Assignee: FASTBRICK IP PTY LTD, High Wycombe (AU)

(*) Notice: Subject to any disclaimer, the term of this patent is extended or adjusted under 35 U.S.C. 154(b) by 281 days.

(21) Appl. No.: 17/293,216

(22) PCT Filed: Nov. 14, 2019

(86) PCT No.: PCT/AU2019/051253
§ 371 (c)(1),
(2) Date: May 12, 2021

(87) PCT Pub. No.: WO2020/097685
PCT Pub. Date: May 22, 2020

(65) Prior Publication Data
US 2021/0379775 A1    Dec. 9, 2021

(30) Foreign Application Priority Data

Nov. 14, 2018 (AU) ................................ 2018904340

(51) Int. Cl.
*B25J 19/02* (2006.01)
*B25J 11/00* (2006.01)
(Continued)

(52) U.S. Cl.
CPC ........... *B25J 19/022* (2013.01); *B25J 13/089* (2013.01); *B25J 11/005* (2013.01); *E04G 21/22* (2013.01); *G05B 2219/45086* (2013.01)

(58) Field of Classification Search
CPC ... B25J 5/00; B25J 9/162; B25J 11/005; B25J 13/08; B25J 13/086; B25J 13/088;
(Continued)

(56) References Cited

U.S. PATENT DOCUMENTS 6,681,145 B1 * 1/2004 Greenwood ........... B25J 9/1692
                                                                      700/193
8,166,727 B2    5/2012   Pivac et al.
(Continued)

FOREIGN PATENT DOCUMENTS

| WO | 2009026641 A1 | 3/2009 |
| WO | 2009026642 A1 | 3/2009 |

(Continued)

OTHER PUBLICATIONS

Udaya, Wijenayake, et al. "Stereo Vision-Based 3D Pose Estimation of Product Labels for Bin Picking." Journal of Institute of Control, Robotics and Systems, vol. 22, No. 1, Institute of Control, Robotics and Systems, Jan. 1, 2016, pp. 8-16. Crossref, doi: 10.5302/j.icros.2016.15.0160.*

(Continued)

*Primary Examiner* — Jeff A Burke
*Assistant Examiner* — Blake A Wood
(74) *Attorney, Agent, or Firm* — Perkins Coie LLP

(57) ABSTRACT

The present disclosure relates to a tracking system for tracking a position and orientation of an object, the tracking system including: a tracking base provided in an environment, the tracking base including: a tracking head support; and, at least three tracking heads mounted to the tracking head support, a target system including at least three targets mounted to the object, each target including a reflector that reflects a radiation beam to the base sensor of a respective tracking head; and, a control system that: causes each tracking head to track a respective target as it moves (Continued)

throughout the environment; determines a position of each target with respect to a respective tracking head; determines an orientation of the target system using at least in part the determined position of each target; and, determines the position and orientation of the object using at least in part the position and orientation of the target system.

19 Claims, 21 Drawing Sheets

(51) Int. Cl.
*B25J 13/08* (2006.01)
*E04G 21/22* (2006.01)

(58) Field of Classification Search
CPC ...... B25J 13/089; B25J 19/022; B25J 19/023; E04G 21/22; G01S 17/66; G01S 17/88; G05B 2219/45086
See application file for complete search history.

(56) References Cited

U.S. PATENT DOCUMENTS

| | | | |
|---|---|---|---|
| 9,720,087 B2* | 8/2017 | Christen | G01S 17/42 |
| 10,627,211 B2* | 4/2020 | Lüthi | G01S 17/36 |
| 10,635,758 B2 | 4/2020 | Pivac et al. | |
| 10,744,645 B2* | 8/2020 | Wang | B25J 9/1692 |
| 10,865,578 B2 | 12/2020 | Pivac et al. | |
| 10,876,308 B2 | 12/2020 | Pivac et al. | |
| 11,106,836 B2 | 8/2021 | Pivac et al. | |
| 11,299,894 B2 | 4/2022 | Pivac | |
| 11,401,115 B2 | 8/2022 | Pivac | |
| 11,441,899 B2 | 9/2022 | Pivac et al. | |
| 11,656,357 B2 | 5/2023 | Pivac et al. | |
| 2009/0038258 A1* | 2/2009 | Pivac | E04G 21/22 |
| | | | 901/1 |
| 2019/0224846 A1 | 7/2019 | Pivac et al. | |
| 2019/0251210 A1 | 8/2019 | Pivac et al. | |
| 2020/0206923 A1 | 7/2020 | Pivac et al. | |
| 2020/0206924 A1 | 7/2020 | Pivac et al. | |
| 2020/0215688 A1 | 7/2020 | Pivac et al. | |
| 2020/0215692 A1 | 7/2020 | Pivac et al. | |
| 2020/0215693 A1 | 7/2020 | Pivac et al. | |
| 2021/0016437 A1 | 1/2021 | Pivac et al. | |
| 2021/0016438 A1 | 1/2021 | Pivac et al. | |
| 2021/0291362 A1 | 9/2021 | Pivac et al. | |
| 2021/0370509 A1 | 12/2021 | Pivac et al. | |

FOREIGN PATENT DOCUMENTS

| | | | |
|---|---|---|---|
| WO | WO-2009026641 A1 * | 3/2009 | ............ B25J 9/1015 |
| WO | 2010054519 A1 | 5/2010 | |
| WO | 2010069160 A1 | 6/2010 | |
| WO | 2018009978 A1 | 1/2018 | |
| WO | 2018009986 A1 | 1/2018 | |

OTHER PUBLICATIONS

Bala Muralikrishnan, Steve Phillips, Daniel Sawyer, Laser trackers for large-scale dimensional metrology: A review, Precision Engineering, vol. 44, 2016, pp. 13-28.*

Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].

Jiang, B.C. et al., "A Review of Recent Developments in Robot Metrology." J. of Manufacturing Systems, vol. 7 No. 4, (1988) pp. 339-357.

* cited by examiner

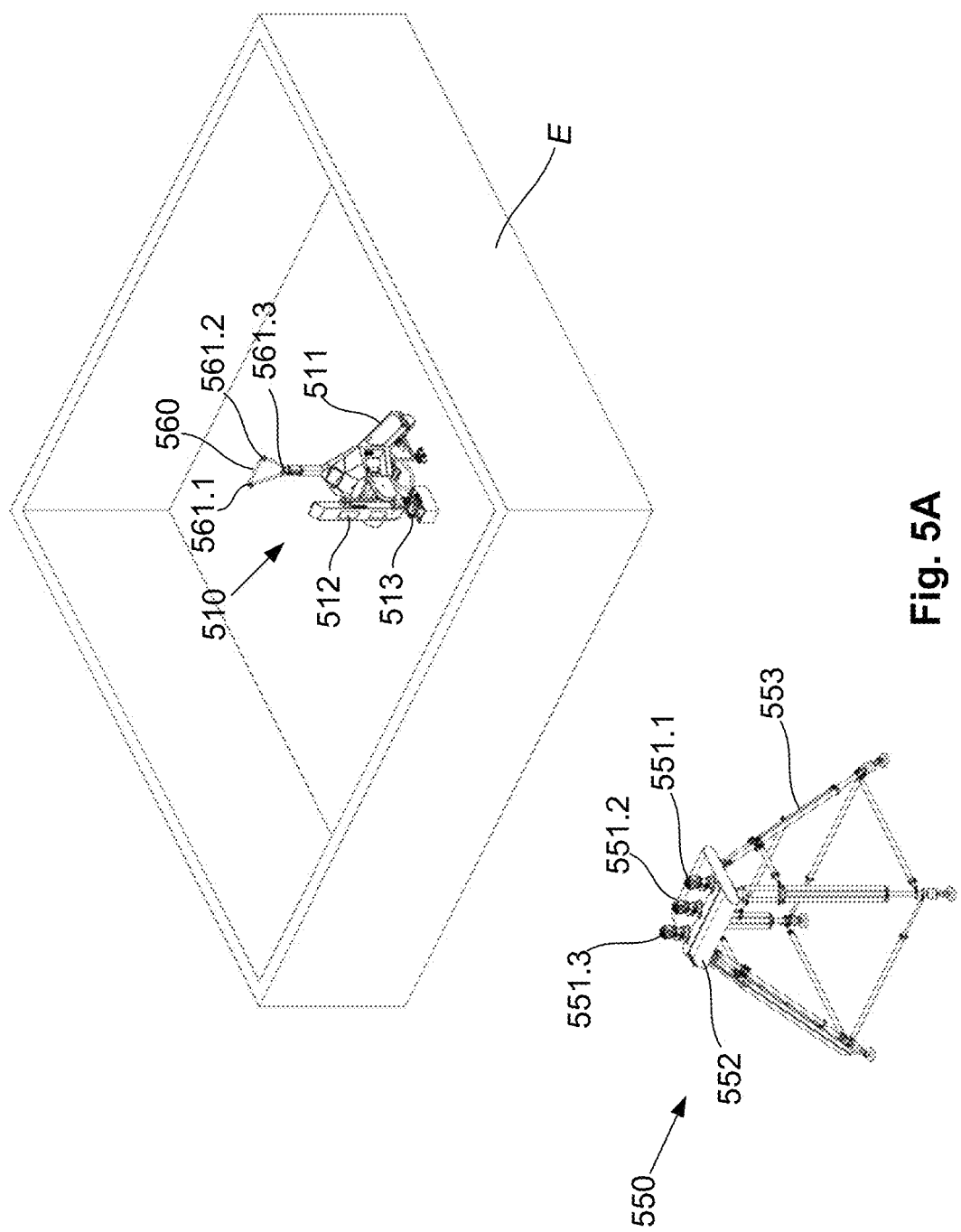

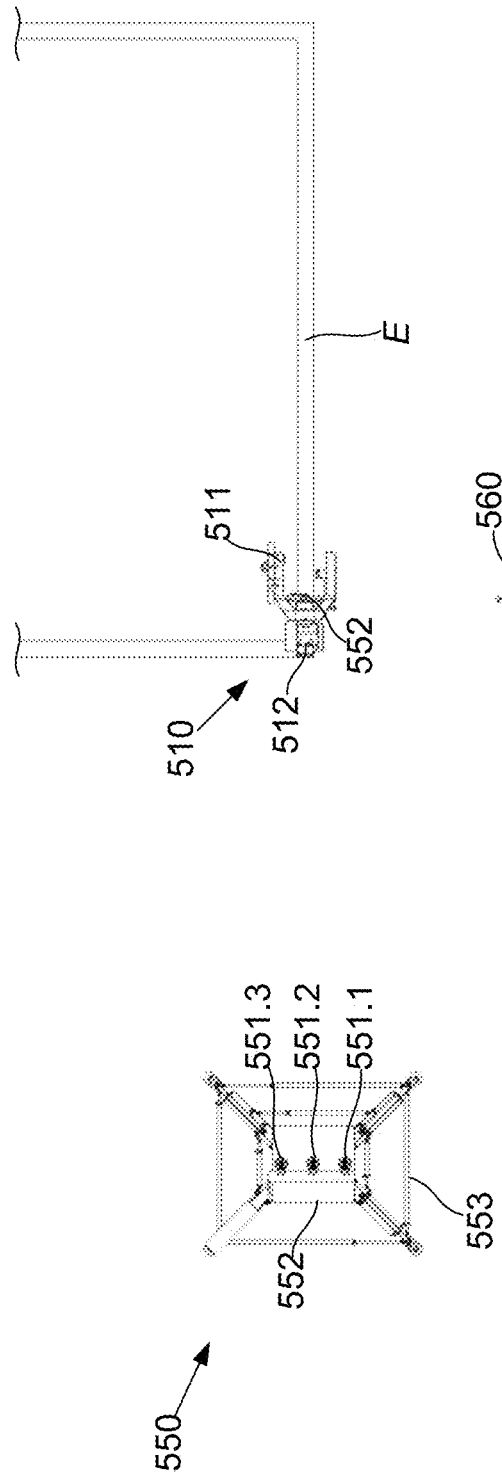

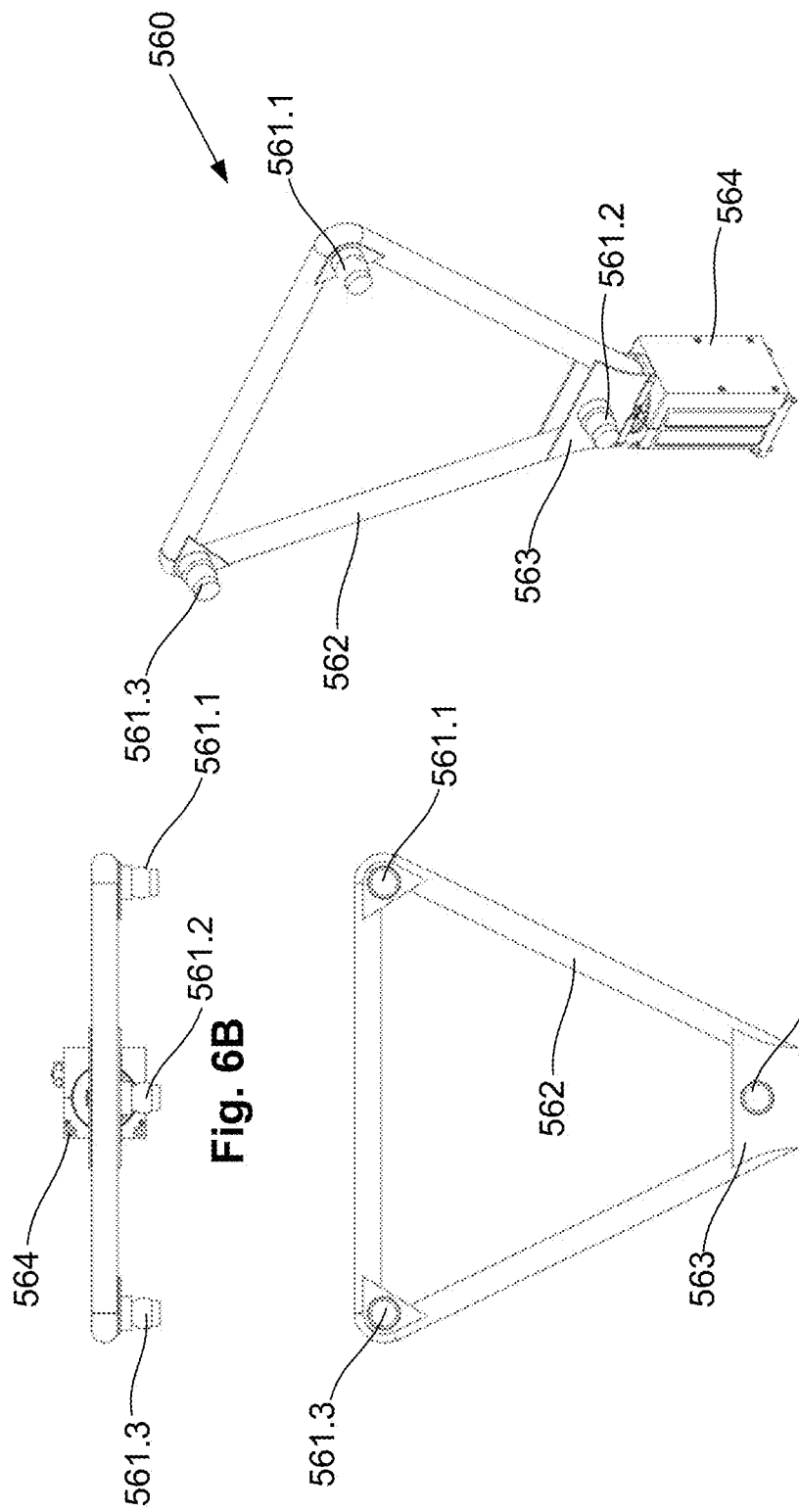

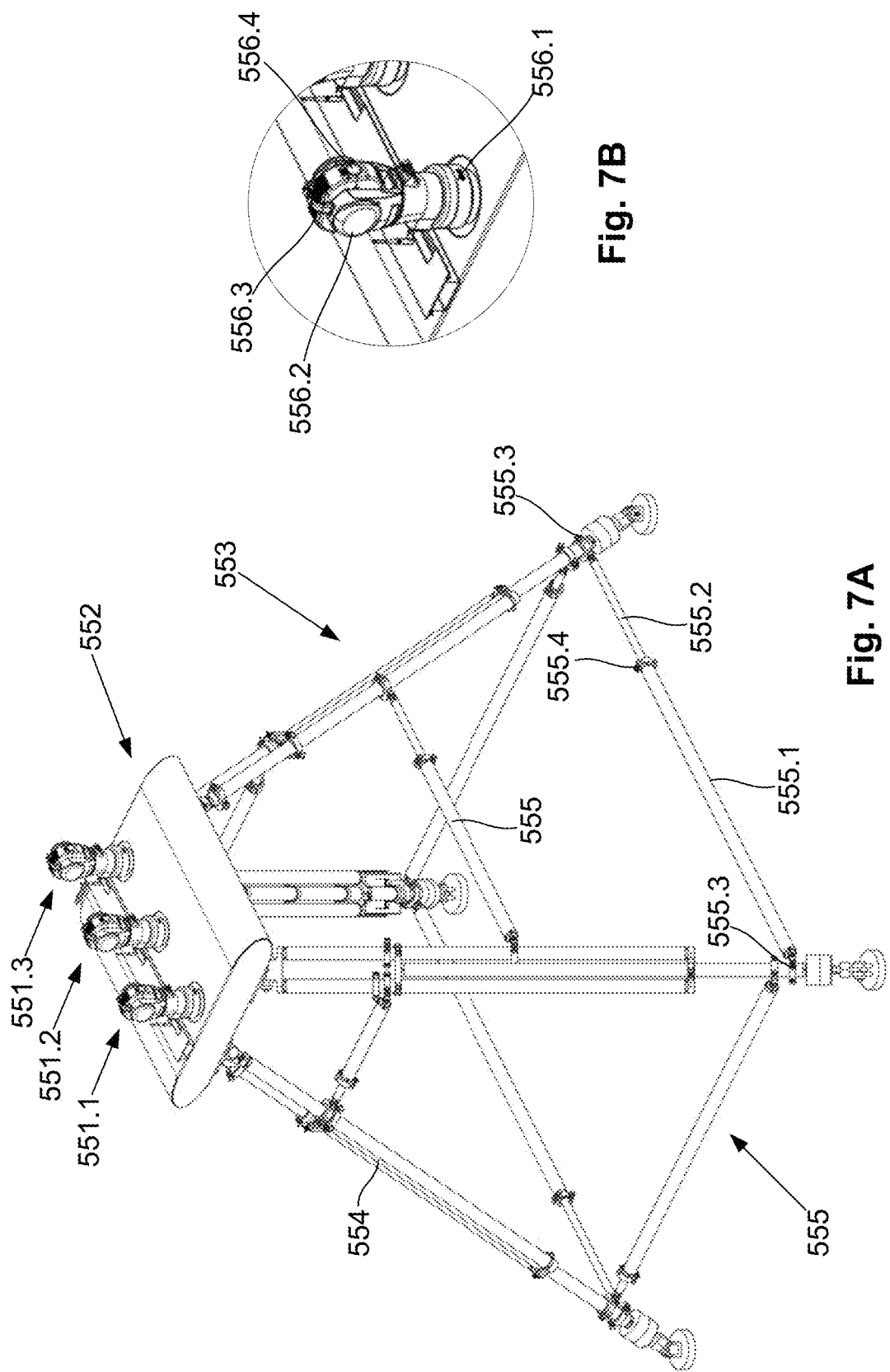

POSITION AND ORIENTATION TRACKING SYSTEM

CROSS REFERENCE TO RELATED APPLICATIONS

This application is a United States national phase entry of International Application No. PCT/AU2019/051253 filed on Nov. 14, 2019, which claims priority to Australian Patent Application No. 2018904340 filed on Nov. 14, 2018, both of which are incorporated herein by reference in their entireties.

BACKGROUND OF THE INVENTION

The present invention relates to systems and methods for tracking a position and orientation of an object relative to an environment, and in one particular example, to systems and methods for tracking a position and orientation of a robot component that undergoes movement relative to the environment, to allow an interaction to be performed within the environment.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide systems in which a robot arm mounted on a moving robot base is used to perform interactions within a physical environment. For example, WO 2007/076581 describes an automated brick laying system for constructing a building from a plurality of bricks comprising a robot provided with a brick laying and adhesive applying head, a measuring system, and a controller that provides control data to the robot to lay the bricks at predetermined locations. The measuring system measures in real time the position of the head and produces position data for the controller. The controller produces control data on the basis of a comparison between the position data and a predetermined or pre-programmed position of the head to lay a brick at a predetermined position for the building under construction. The controller can control the robot to construct the building in a course by course manner where the bricks are laid sequentially at their respective predetermined positions and where a complete course of bricks for the entire building is laid prior to laying of the bricks for the next course.

Laser trackers such as those described in U.S. Pat. Nos. 4,714,339 and 4,790,651 can be used to measure the position and orientation of a target which is fitted to an object. Kyle in CMSC: Charlotte-Concord, Jul. 21-25, 2008, describes a laser tracker polar measurement system for measuring the position and orientation of a target with six degrees of freedom.

Manufacturers API (Radian and OT2 with STS (Smart Track Sensor)), Leica (AT960 and Tmac) and Faro provide laser tracker systems, some of which can measure position and orientation of the target. These systems measure position at 300 Hz, or 1 kHz or 2 kHz (depending on the equipment). Orientation measurements (for STS and Tmac) rely on respective vision systems using 2D cameras which measure at a current maximum of 100 Hz. Accelerometer data such as from a tilt sensor or INS (Inertial navigation System) can be used to determine or predict or interpolate orientation measurements at up to 1000 Hz but the orientation accuracy may be reduced to 0.01 degree with the known systems.

Such laser trackers can be used to make accurate position measurements of a robot component, such as an end effector on a robotic arm. Data obtained from a laser tracker and an active target equating to position and optionally orientation of the active target located on or proximal to the end effector is used to control at least the position and preferably also the orientation of the end effector and hence stabilise the end effector. However, in order for such stabilisation to operate effectively, it is important to be able to know the position and orientation of a robot component in real time. This can be difficult to achieve in practice. For example, there is often not line of sight between a tracker and an end effector. Furthermore, the further the end effector is from the position where a tracking target is mounted, the greater the end effector positional error due to orientation measurement error.

For example, existing laser trackers, such as the Leica AT960 series with Tmac or T probe have a resolution of 0.01 degrees, a 10 ms latency and an orientation data measurement rate of 10 ms. The system interpolates and predicts orientation measurements to 1 ms increments but introduces prediction error which results in step changes of orientation data when new measurements are made each 10 ms. Similarly, the API Radian and STS measures yaw and pitch orientation by measuring beam angle with encoders, whilst a tilt sensor is used to measure gravity and calculate roll. It has a resolution of 0.01 degrees but is very sensitive to error induced by acceleration and in its current form is not suitable for dynamic measurements.

If a target is 1500 mm from the robot component, a 0.1 degree error becomes a positional error of 2.6 mm, which is unsuitable for sub-millimetre performance required in many control applications. Accordingly, it is generally necessary to achieve an accuracy of 0.01 degree, or more preferably 0.001 degree, which leads to errors of 0.26 mm and 0.026 mm, respectively.

However, if the error is varying with each measurement, the error can result in compensation movements used in stabilisation creating a vibration in the end effector and the robot. In this case, for smaller errors, the resulting vibration is smaller, but nevertheless, still problematic.

Whilst applying a filter can remove or reduce vibration, this introduces a lag or delay, which means the actual position measured is no longer accurate. The natural frequency of long boom or arm structures (e.g. 10-40 m) is typically in the range of 0.25 Hz to 4 Hz and the natural frequency of highly dynamic robots is in the range of 10 Hz to 540 Hz. This means that 1 kHz positional error noise that is being used to create compensation commands may create acoustic noise in the machine but probably not much vibration, whereas 100 Hz positional error noise may excite primary harmonics of the machine structure resulting in substantial structural vibration at times.

Thus, a varying 2.6 mm position error is virtually useless for fine placement work and can only be used for gross deflection correction. Whilst a varying 0.26 mm position error is useful for fine positioning (e.g. brick laying or general assembly tasks), this can introduce substantial vibration, meaning it needs a filter, which in turn introduces a delay. If the data rate is 10 ms then a moving average filter can introduce 20 ms to 40 ms of delay which then means it is not useful for dynamic positioning or for compensation of a rapidly moving boom. For example, if the target is moving at 100 mm per second then a 20 ms delay results in a positional error of 2 mm.

By comparison, if the data update rate is 1 ms, and the varying positional error is 0.026 mm, this means that no filtering is required. For a latency of 2 ms and target speed of 100 mm/s, a positional error of 0.2 mm is introduced which is acceptable for fine positioning tasks such as brick laying.

Thus it can be seen that the requirements for orientation accuracy and data rate exceed the current performance of the above mentioned Leica AT960 and Tmac and API Radian and STS systems.

SUMMARY OF THE PRESENT INVENTION

In one broad form, an aspect of the present invention seeks to provide a tracking system for tracking a position and orientation of an object, the tracking system including: a tracking base provided in an environment, the tracking base including: a tracking head support; and, at least three tracking heads mounted to the tracking head support, each tracking head having: a radiation source arranged to send a radiation beam to a respective target; a base sensor that senses reflected radiation; at least one tracking head actuator that controls an orientation of the tracking head; and, at least one tracking head angle sensor that monitors an orientation of the tracking head; a target system including at least three targets mounted to the object, each target including a reflector that reflects the radiation beam to the base sensor of a respective tracking head; and, a control system that: causes each tracking head to track a respective target as it moves throughout the environment; determines a position of each target with respect to a respective tracking head at least in part using signals from: each base sensor; and, the at least one tracking head angle sensor; determines an orientation of the target system using at least in part the determined position of each target; and, determines the position and orientation of the object using at least in part the position and orientation of the target system.

In one embodiment, the position of each target is determined using a distance measurement obtained from the base sensor and elevation and azimuth angles obtained from the at least one tracking head angle sensor.

In one embodiment, signals from a base sensor of a respective tracking head are used to control the at least one tracking head actuator to ensure that the tracking head tracks the target as it moves throughout the environment.

In one embodiment, the position of each target is relative to a local coordinate system of the respective tracking head.

In one embodiment, a first tracking head defines a tracking base coordinate system and the position measurements of at least second and third tracking heads are transformed into the tracking base coordinate system using tracker calibration data.

In one embodiment, the tracker calibration data defines the geometric relationship between the local coordinate systems of each respective tracking head.

In one embodiment, the control system determines the position of each target in an environment coordinate system using environment calibration data.

In one embodiment, the environment calibration data defines the geometric relationship between the tracking base coordinate system and the environment coordinate system.

In one embodiment, the position of each target in the environment coordinate system is used to define position vectors and a vector cross product is calculated to define a normal vector to a plane of the target system which defines the orientation of the target system in the environment coordinate system.

In one embodiment, the position and orientation of the target system is transformed into the position and orientation of the object using target system calibration data which defines the geometric relationship between the target system and the object.

In one embodiment, each tracking head is calibrated relative to the environment coordinate system such that the control system transforms positional data from each tracking head directly into the environment coordinate system.

In one embodiment, the control system compares the determined position and orientation of the object with a desired position and orientation of the object and calculates a compensation vector in accordance with results of the comparison.

In one embodiment, each target is mounted to a pan and/or tilt controlled mount operable to assist the targets in maintaining line of sight with the tracking heads.

In one embodiment: the at least three tracking heads are spaced apart by at least one of: 100 mm to 1000 mm; 250 mm to 750 mm; and, about 500 mm; and, the at least three targets are spaced apart by at least one of: 100 mm to 1000 mm; 250 mm to 750 mm; and, about 500 mm.

In one embodiment, the at least three targets are mounted on at least one of: a target support; and, directly on the object.

In one embodiment, the target support is at least one of: rotatably mounted to the object; and, fixed relative to the object.

In one embodiment, the at least three targets are mounted in a plane and spaced apart in two dimensions to thereby form a triangular target array.

In one embodiment, the target support includes a triangular frame, with a target mounted proximate each apex.

In one embodiment, the position of the multiple targets relative to the object is fixed.

In one embodiment, the targets are rigidly mounted to the object and wherein the control system selectively switches tracking of targets to maintain line of sight between the tracking heads and targets.

In one embodiment, the selective switching of targets ensures that at least three targets are continuously tracked by the tracking heads.

In one embodiment, each target is a spherically mounted retroreflector (SMR).

In one embodiment, the tracking head support includes a platform and wherein the multiple tracking heads are rigidly mounted to the platform.

In one embodiment, the multiple tracking heads are mounted in a co-linear arrangement on the platform.

In one embodiment, the tracking base includes a number of legs that support the platform in an elevated position relative to the environment.

In one embodiment, the platform is elevated to a height that is at least one of: 2 m to 4 m; 2 m to 3 m; and, at least 2.5 m.

In one embodiment, the platform has an elongate tubular structure and three elongate tubular legs downwardly depend therefrom in a tripod configuration.

In one embodiment, a pair of outer legs are bonded to the platform and a third inner leg is rotatably mounted to the platform permitting the tracking base to fold into a substantially planar configuration for transport.

In one embodiment, the tubular legs include a hose fitting and valve operable to allow each leg to be at least partially filled with water.

In one embodiment, the legs terminate in a ground engaging spike.

In one embodiment, under wind loading of up to 5 m/s the platform undergoes a rotation that is at least one of: less than ±0.01°; less than ±0.05°, and, less than ±0.001°.

In one embodiment, the tracking head support at least one of: includes an active cooling system; is at least partially made of a material having a low thermal expansion coefficient; and, is coated in a heat resistant or heat reflective coating.

In one embodiment, the object is a robot base having a robot arm and end effector mounted thereon configured to perform an interaction in the environment, wherein the robot base undergoes movement relative to the environment and the tracking system measures a robot base position and determines an orientation of the robot base relative to the environment.

In one embodiment, the robot base includes a head mounted to a boom.

In one embodiment, the boom is attached to a vehicle.

In one embodiment, the tracking system is used for tracking the position and orientation of a brick laying head of a robotic brick laying machine.

In one embodiment, the brick laying head is programmed to construct the brick walls of a house on a building slab.

In one embodiment, the environment is a building site and an environment coordinate system is defined as a building slab coordinate system.

In another broad form, an aspect of the present invention seeks to provide a robotic block laying system, including: a block laying robot including: a truck base; a telescopingly extendable and foldable boom mounted to the truck base; a block laying and adhesive applying head mounted at the end of the boom for receiving blocks transported along the boom from the truck base and laying blocks in a predetermined position; and, a tracking base provided in an environment, the tracking base including: a tracking head support; and, at least three tracking heads mounted to the tracking head support, each tracking head having: a radiation source arranged to send a radiation beam to a respective target; a base sensor that senses reflected radiation; at least one tracking head actuator that controls an orientation of the tracking head; and, at least one tracking head angle sensor that monitors an orientation of the tracking head; a target system including at least three targets mounted to the block laying and adhesive applying head, each target including a reflector that reflects the radiation beam to the base sensor of a respective tracking head; and, a control system that: causes each tracking head to track a respective target as it moves throughout the environment; determines a position of each target with respect to a respective tracking head at least in part using signals from: each base sensor; and, the at least one tracking head angle sensor; determines an orientation of the target system using at least in part the determined position of each target; and, determines the position and orientation of the brick laying and adhesive applying head using the position and orientation of the target system.

In one embodiment, the determined position and orientation of the block laying and adhesive applying head is compared to a desired position and orientation of the block laying and adhesive applying head and a compensation vector is calculated using results of the comparison.

In one embodiment, the target system includes: at least one target actuator that controls an orientation of the targets; and, at least one target angle sensor that monitors an orientation of the targets, and wherein the control system: determines a relative position of each target with respect to the respective tracking head at least in part using signals from the at least one target angle sensor; and, controls the at least one target actuator using the relative position of each target.

In one embodiment, the platform includes an inner structural platform core and an outer platform heat shield spaced from the platform core.

In one embodiment, the legs and tracking heads are mounted to a platform core.

In one embodiment, the platform is a rectangular platform with a leg extending from each corner.

In one embodiment, the legs are extendible.

In one embodiment, the platform includes a levelling indicator.

In one embodiment, each leg includes at least one leg member.

In one embodiment, each leg member includes an inner structural leg tube and an outer leg heat shield.

In one embodiment, each leg member includes leg end pieces including: an inner plug that engages the leg tube; and, an outer plug that engages the outer heat shield.

In one embodiment, each leg includes: a pair of parallel spaced apart upper leg members; and, a single lower leg member slidably mounted between the upper leg members.

In one embodiment, the upper leg members are interconnected proximate each end via connecting brackets, with an upper connecting bracket being hingably mounted to the platform and the lower leg member being slidably mounted within a lower connecting bracket.

In one embodiment, each connecting bracket is attached to leg end pieces of the upper leg members.

In one embodiment, the lower leg member includes a guide member attached proximate an upper end of the lower leg member, the guide member being slidably mounted to the upper leg members.

In one embodiment, each leg includes a foot.

In one embodiment, each leg includes a shock absorber mounted between the foot and the leg.

In one embodiment, the guide and shock absorber each support lower leg end pieces.

In one embodiment, the legs are interconnected via lateral struts.

In one embodiment, the lateral struts are telescopic.

In one embodiment, the tracking base support includes: upper struts connected to upper leg members; and lower struts connected to lower leg members.

In one embodiment, the multiple targets are mounted on a target support supported by a mast extending from the robot base.

In another broad form, an aspect of the present invention seeks to provide a sensor support for supporting a sensing arrangement, the support including: a platform that in use supports the sensing arrangement, the platform including: an inner structural platform core; and an outer platform heat shield spaced from the platform core; a number of extendible legs coupled to the platform core that support the platform in an elevated position relative to an environment, each leg including: a pair of parallel spaced apart upper leg members interconnected proximate each end via connecting brackets, with an upper connecting bracket being hingably mounted to the platform core; and, a single lower leg member slidably mounted between the upper leg members within a lower connecting bracket, wherein each leg member includes: an inner structural leg tube; and, an outer leg heat shield.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIG. 5A is a partial schematic perspective view of a specific example of a system for performing interactions including a tracking system;

FIG. 5B is a schematic plan view of the system of FIG. 5A;

FIG. 5C is a schematic side view of the system of FIG. 5A;

FIG. 6B is a schematic plan view of the target of FIG. 6A;

FIG. 6C is a schematic front view of the target of FIG. 6A;

FIG. 6D is a schematic perspective view of the target of FIG. 6A;

FIG. 7A is a schematic diagram of an example of a tracking base;

FIG. 7B is a schematic close up perspective view of a tracking head of the tracking base of FIG. 7A;

DETAILED DESCRIPTION OF THE PREFERRED EMBODIMENTS

Figure 1A:
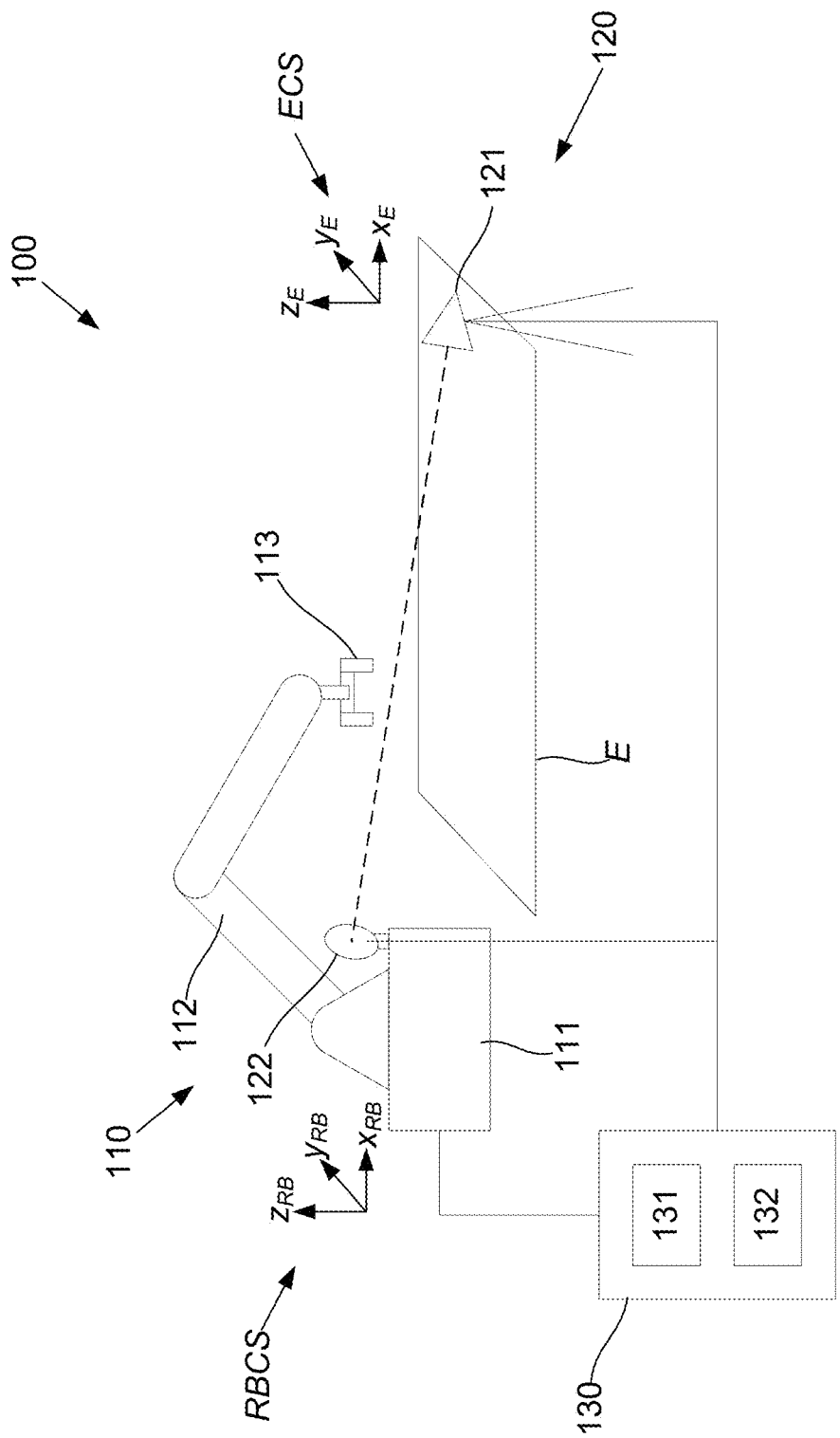
FIG. 1A is a schematic diagram illustrating a first example of a system for performing interactions within a physical environment.

The following description explains a number of different systems and methods for performing interactions within an environment. For the purpose of illustration, the following definitions apply to terminology used throughout.

The term "interaction" is intended to refer to any physical interaction that occurs within, and including with or on, an environment. Example interactions could include placing material or objects within the environment, removing material or objects from the environment, moving material or objects within the environment, modifying, manipulating, or otherwise engaging with material or objects within the environment, modifying, manipulating, or otherwise engaging with the environment, or the like. Further examples of interactions will become apparent from the following description, and it will be appreciated that the techniques could be extended to a wide range of different interactions, and specified examples are not intended to be limiting. Furthermore, in some examples, interactions may comprise one or more distinct steps. For example, when brick laying, an interaction could include the steps of retrieving a brick from a brick supply mechanism and then placing the brick in the environment.

The term "environment" is used to refer to any location, region, area or volume within which, or on which, interactions are performed. The type and nature of the environment will vary depending on the preferred implementation and the environment could be a discrete physical environment, and/or could be a logical physical environment, delineated from surroundings solely by virtue of this being a volume within which interactions occur. Non-limiting examples of environments include building or construction sites, parts of vehicles, such as decks of ships or loading trays of lorries, factories, loading sites, ground work areas, or the like, and further examples will be described in more detail below.

A robot arm is a programmable mechanical manipulator. In this specification a robot arm includes multi axis jointed arms, parallel kinematic robots (such as Stewart Platform, Delta robots), spherical geometry robots, Cartesian robots (orthogonal axis robots with linear motion) etc.

A boom is an elongate support structure such as a slewing boom, with or without stick or dipper, with or without telescopic elements, telescoping booms, telescoping articulated booms. Examples include crane booms, earthmover booms, truck crane booms, all with or without cable supported or cable braced elements. A boom may also include an overhead gantry structure, or cantilevered gantry, or a controlled tensile truss (the boom may not be a boom but a multi cable supported parallel kinematics crane (see PAR systems, Tensile Truss—Chernobyl Crane)), or other moveable arm that may translate position in space.

An end effector is a device at the end of a robotic arm designed to interact with the environment. An end effector may include a gripper, nozzle, sand blaster, spray gun, wrench, magnet, welding torch, cutting torch, saw, milling cutter, router cutter, hydraulic shears, laser, riveting tool, or the like, and reference to these examples is not intended to be limiting.

TCP is an abbreviation of tool centre point. This is a location on the end effector (or tool), whose position and orientation define the coordinates of the controlled object. It is typically located at the distal end of the kinematic chain. Kinematic chain refers to the chain of linkages and their joints between the base of a robot arm and the end effector.

CNC is an abbreviation for computer numerical control, used for automation of machines by computer/processor/microcontroller executed pre-programmed sequences of machine control commands.

The application of coordinate transformations within a CNC control system is usually performed to allow programming in a convenient coordinate system. It is also performed to allow correction of workpiece position errors when clamped in a vice or fixture on a CNC machining centre.

These coordinate transformations are usually applied in a static sense to account for static coordinate shifts or to correct static errors.

Robots and CNC machines are programmed in a convenient Cartesian coordinate system, and kinematic transformations are used to convert the Cartesian coordinates to joint positions to move the pose of the robot or CNC machine.

Measuring the position of a robot arm end effector close to the TCP in real time increases the accuracy of a robot. This is performed on static end effectors on robots used for probing and drilling. This is achieved by a multi-step process of moving to the programmed position, taking a position measurement, calculating a correction vector, adding the compensation vector to the programmed position and then moving the TCP to the new position. This process is not done in hard real time and relies on a static robot arm pose.

Examples of systems for performing interactions within physical environments will now be described with reference to FIGS. 1A to 1C and FIG. 2.

In the example of FIG. 1A the system 100 includes a robot assembly 110 including a robot base 111, a robot arm 112 and an end effector 113. The robot assembly 110 is positioned relative to an environment E, which in this example is illustrated as a 2D plane, but in practice could be a 3D volume of any configuration. In use, the end effector 113 is used to perform interactions within the environment E, for example to perform bricklaying, object manipulation, or the like.

The system 100 also includes a tracking system 120, which is able to track the robot assembly movement, and in one particular example, movement of the robot base relative to the environment. In one example, the tracking system includes a tracking base 121, which is typically statically positioned relative to the environment E and a tracking target 122, mounted on the robot base 111, allowing a position of the robot base 111 relative to the environment E to be determined.

In one example, the tracking system 120 includes a tracking base 121 including a tracking head having a radiation source arranged to send a radiation beam (e.g. laser) to the target 122 and a base sensor that senses reflected radiation. A base tracking system is provided which tracks a position of the target 122 and controls an orientation of the tracking head to follow the target 122 as it moves throughout the environment. In one example, the target 122 includes a target sensor that senses the radiation beam and a target tracking system that tracks a position of the tracking base and controls an orientation of the target to follow the tracking head, although this may not be required in a passive system. Angle sensors may be provided in the head and the target that determine an orientation of the head and target respectively. A tracker processing system determines a relative position of the tracker base and target in accordance with signals from the sensors, specifically using signals from the angle sensors to determine relative angles of the tracker and target, whilst time of flight of the radiation beam can be used to determine a physical separation. In a further example, the radiation can be polarised in order to allow a roll of the target relative to the tracking head to be determined. Although a single tracking system 120 including a head and target is shown, this is not essential and in other examples multiple tracking systems and/or targets can be provided as will be described in more detail below.

In one particular example, the tracking system is a laser tracking system and example arrangements are manufactured by API (Radian and OT2 with STS (Smart Track Sensor)), Leica (AT960 and Tmac) and Faro. These systems measure position at 300 Hz, or 1 kHz or 2 kHz (depending on the equipment) and rely on a combination of sensing arrangements, including laser tracking, vision systems using 2D cameras, accelerometer data such as from a tilt sensor or INS (Inertial navigation System) and can be used to make accurate position measurements, with data obtained from the laser tracker and active target equating to position and optionally orientation of the active target relative to the environment E. As such systems are known and are commercially available, these will not be described in any further detail.

It will also be appreciated that other position/movement sensors, such as an inertial measurement unit (IMU) can also be incorporated into the system, as will be described in more detail below.

A control system 130 is provided in communication with the tracking system 120 and the robot assembly 110 allowing the robot assembly to be controlled based on signals received from the tracking system. The control system typically includes one or more control processors 131 and one or more memories 132. For ease of illustration, the remaining description will make reference to a processing device and a memory, but it will be appreciated that multiple processing devices and/or memories could be used, with reference to the singular encompassing the plural arrangements. In use the memory stores control instructions, typically in the form of applications software, or firmware, which is executed by the processor 131 allowing signals from the tracking system 120 and robot assembly 110 to be interpreted and used to control the robot assembly 110 to allow interactions to be performed.

Figure 2:
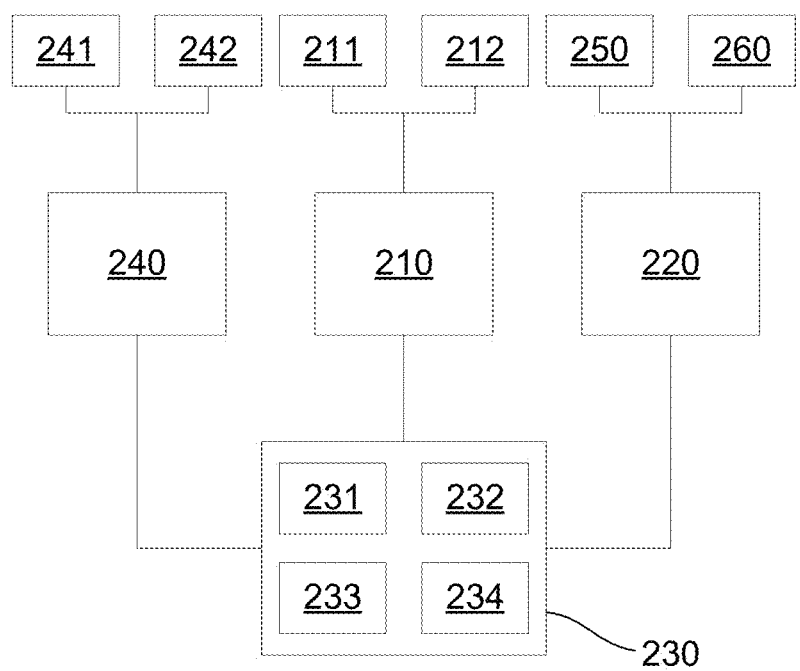
FIG. 2 is a schematic diagram of an example of a control system for the systems of FIGS. 1A to 1C.

An example of the control system 130 is shown in more detail in FIG. 2.

In this example the control system 230 is coupled to a robot arm controller 210, a tracking system controller 220 and a boom controller 240. The robot arm controller 210 is coupled to a robot arm actuator 211 and end effector actuator 212, which are able to control positioning of the robot arm 112 and end effector 113, respectively. The tracking system controller 220 is coupled to the tracking head 121 and target 122 via tracking head actuator 250 and optionally target actuator 260, allowing the tracking system to be controlled and relative positions of the tracking head 121 and target 122 to be ascertained and returned to the control system 230. The boom controller 240 is typically coupled to boom actuators 241, 242 which can be used to position the boom and hence robot base. It is to be understood that in practice the robot arm, end effector and boom will have multiple actuators such as servo motors, hydraulic cylinders and the like to effect movement of their respective axes (i.e. joints) and reference to single actuators is not intended to be limiting.

Each of the robot arm controller 210, tracking system controller 220, and boom controller 240 typically include electronic processing devices, operating in conjunction with stored instructions, and which operate to interpret commands provided by the control system 230 and generate control signals for the respective actuators and/or the tracking system and/or receive signals from sensors and provide relevant data to the control system 230. The electronic processing devices could include any electronic processing device such as a microprocessor, microchip processor, logic gate configuration, firmware optionally associated with implementing logic such as an FPGA (Field Programmable Gate Array), or any other electronic device, system or arrangement. It will be appreciated that the robot arm controller 210, tracking system controller 220 and boom controller 240 typically form part of the boom assembly, robot assembly and tracking system, respectively. As the operation of such systems would be understood in the art, these will not be described in further detail.

The control system 230 typically includes an electronic processing device 231, a memory 232, input/output device 233 and interface 234, which can be utilised to connect the control system 230 to the robot arm controller 210, tracking system controller 220 and boom controller 240. Although a single external interface is shown, this is for the purpose of example only, and in practice multiple interfaces using various methods (eg. Ethernet, serial, USB, wireless or the like) may be provided.

In use, the processing device 231 executes instructions in the form of applications software stored in the memory 232 to allow the required processes to be performed. The applications software may include one or more software modules, and may be executed in a suitable execution environment, such as an operating system environment, or the like.

Accordingly, it will be appreciated that the control system 230 may be formed from any suitable processing system, such as a suitably programmed PC, computer server, or the like. In one particular example, the control system 230 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

It will also be appreciated that the above described arrangements are for the purpose of illustration only and practice a wide range of different systems and associated control configurations could be utilised. For example, it will be appreciated that the distribution of processing between the controllers and/or control system could vary depending on the preferred implementation.

For the purpose of the following examples, reference will be made to an environment coordinate system ECS, which is static relative to the environment E, and a robot base coordinate system RBCS, which is static relative to the robot base 111. Additionally, some examples will make reference to a robot base actuator coordinate system BACS, which is a coordinate system used to control movement of the robot base, for example to control movement of the boom assembly.

In practice, in the above described examples, the robot base 111 undergoes movement relative to the environment E. The nature of the movement will vary depending upon the preferred implementation. For example, the robot base 111 could be static, with the environment E moving. A good example of this is when a robot arm is provided on a dock and is attempting to interact with objects present on the deck of a boat, which is undergoing movement relative to the dock. However, it will be appreciated that similar relative movement will arise in a range of different circumstances.

Figure 1B:
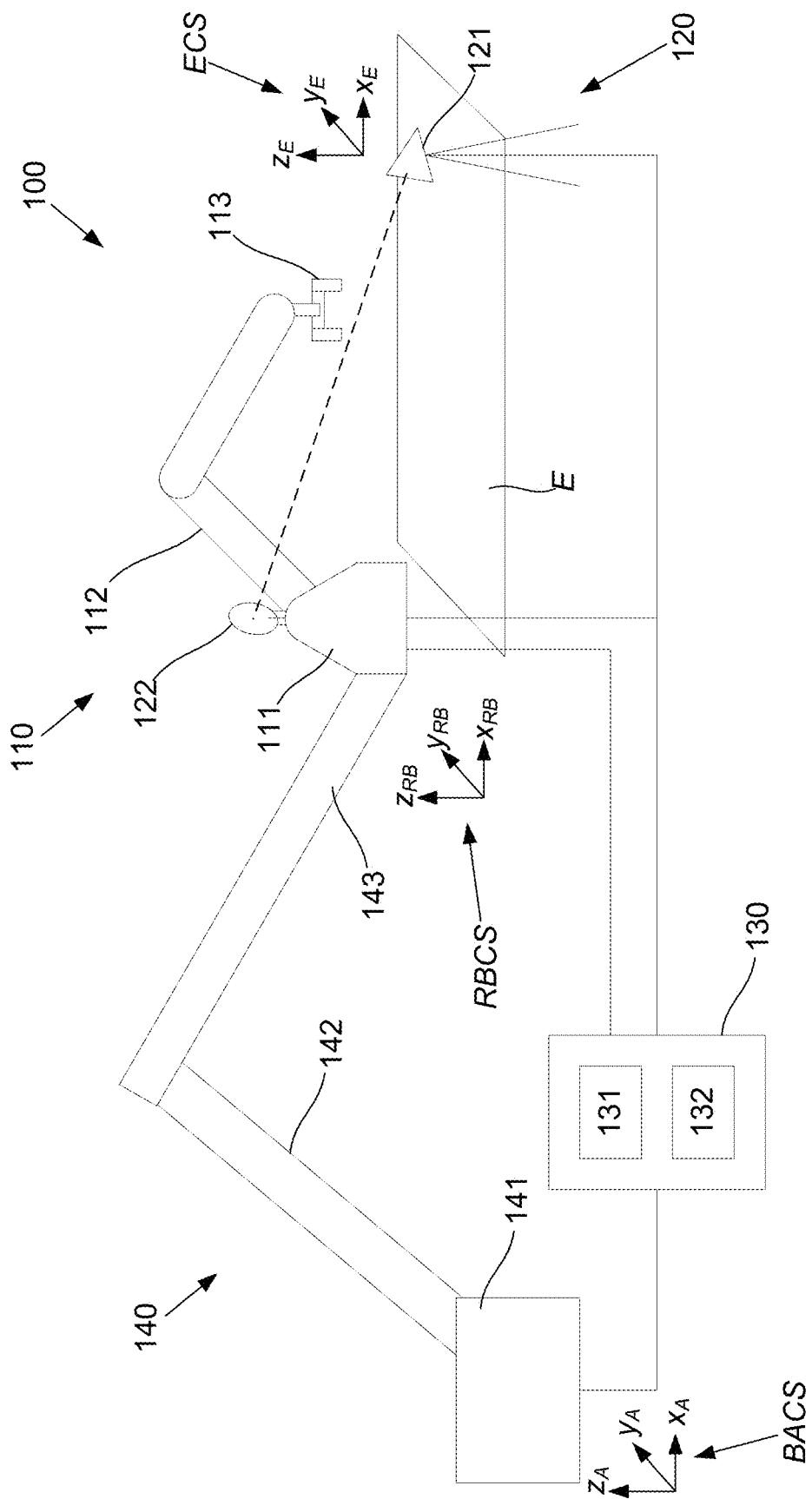
FIG. 1B is a schematic diagram of a second example of a system for performing interactions within a physical environment.
Figure 1C:
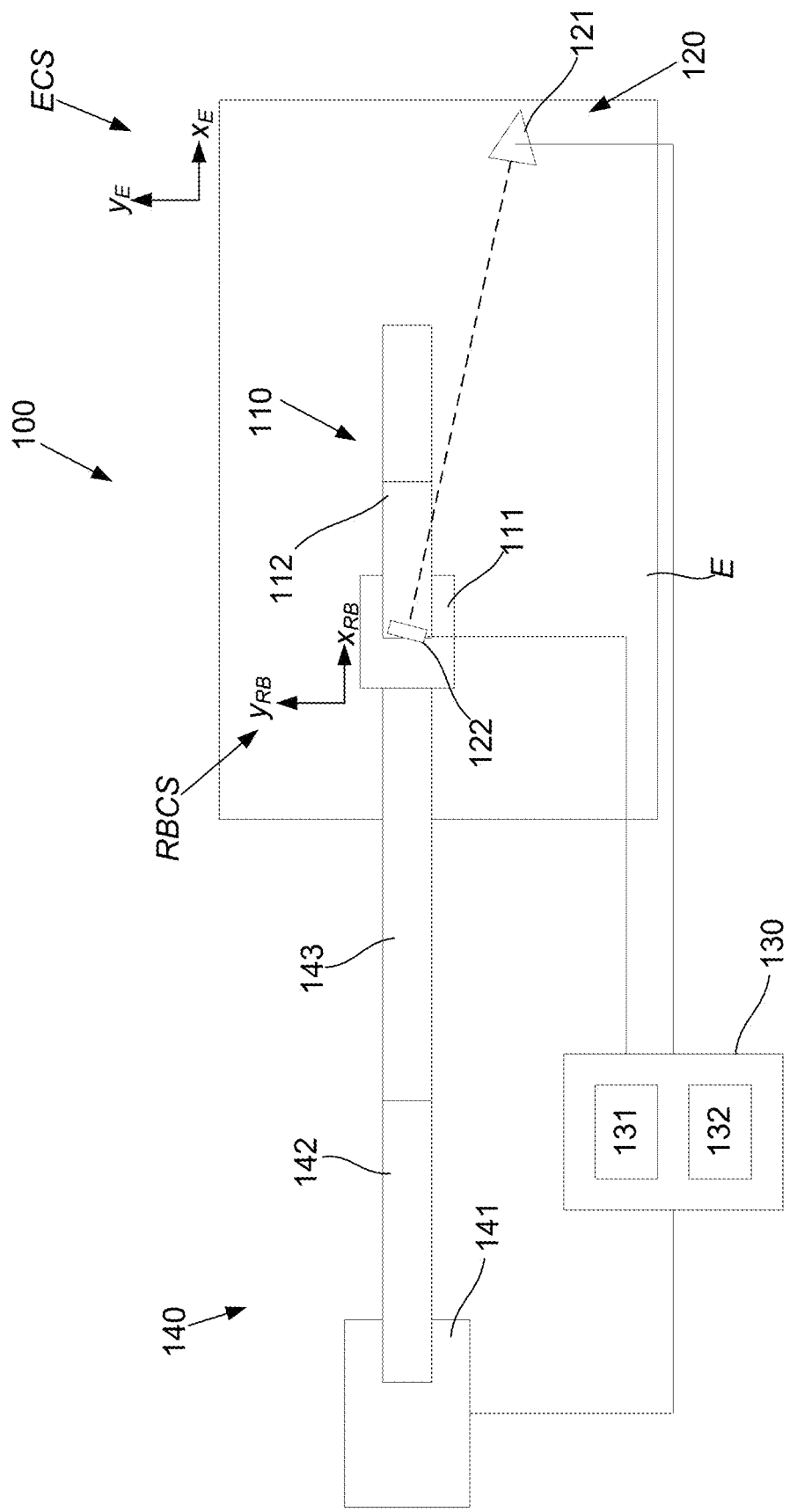
FIG. 1C is a schematic plan view of the system of FIG. 1B.

Alternatively, in the example shown in FIG. 1B, the robot base 111 is supported by a robot base actuator 140, which can be used to move the robot base. In this example, the robot base actuator is in the form of a boom assembly including a boom base 141, boom 142 and stick 143. The boom is typically controllable allowing a position and/or orientation of the robot base to be adjusted. The types of movement available will vary depending on the preferred implementation. For example, the boom base 141 could be mounted on a vehicle allowing this to be positioned and optionally rotated to a desired position and orientation. The boom and stick 142, 143 can be telescopic arrangements, including a number of telescoping boom or stick members, allowing a length of the boom or stick to be adjusted. Additionally, angles between the boom base 141 and boom 142, and boom 142 and stick 143, can be controlled, for example using hydraulic actuators, allowing the robot base 111 to be provided in a desired position relative to the environment E. Such operation is typically performed in the robot base actuator coordinate system BACS, although this is not essential as will become apparent from the remaining description.

An example of a system of this form for laying bricks is described in WO 2018/009981 the content of which is incorporated herein by cross reference. It will be appreciated however that such arrangements are not limited to bricklaying, but could also be utilised for other forms of interactions.

Depending on the implementation, the boom assembly can have a significant length, so for example in the case of a construction application, the boom may need to extend across a construction site and could have a length of tens of meters. In such circumstances, the boom is typically subject to a variety of loads, including forces resulting from movement of the boom and/or robot arm, wind loading, machinery vibrations, or the like, which can in turn induce oscillations or other movement in the end of the boom, in turn causing the robot base to move relative to the environment. Such movement will be referred to generally as unintentional movement. Additionally, as described above, the robot base can be moved in a controlled manner by actively moving the boom and such movement will be referred to generally as intentional movement.

In any event, it will be appreciated that in both of the above described examples, the robot base and hence the robot base coordinate system RBCS moves relative to the environment and hence environment coordinate system ECS, which substantially complicates the control process, and in particular the ability of the end effector to be accurately positioned so as to perform an interaction within the environment. In this regard, in normal robot applications, the end effector is controlled in the robot base coordinate system RBCS, whilst the end effector needs to be positioned in the environment coordinate system ECS, and as the movement results in the two coordinate systems moving relative to each other, this makes accurately positioning the end effector difficult.

Figure 3:
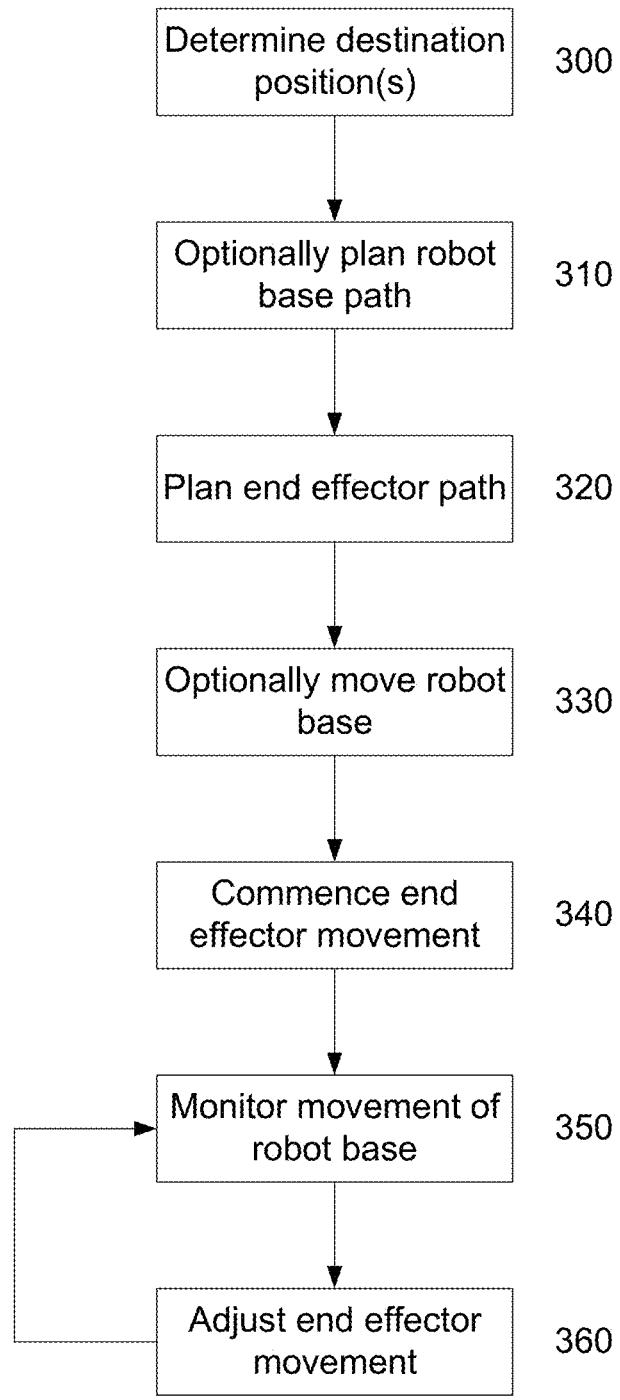
FIG. 3 is a flowchart of an example of a process for performing a physical interaction.

An example of the process for performing an interaction within the environment E will now be described with reference to FIG. 3.

For the purpose of the following explanation reference will be made to a term "destination". The term is intended to refer to a position and optionally orientation (in combination referred to as a pose) at which the end effector 113 is to be provided, either as part of performing an interaction or otherwise. For example, the destination could correspond to the location within the environment at which the interaction is to occur. However, this is not essential, and alternatively the destination could correspond to any position through which the end effector should pass, in effect defining multiple destinations leading to a final destination. For example, an interaction may involve sequences of end effector movements, optionally forming part of different steps, and the term destination could refer to any position forming part of the different steps. Thus, the term destination should therefore be interpreted to refer to any particular point at which the end effector is to be positioned and in some examples, a destination could be a static point at which an end effector is to be maintained for a period of time for example while other processes are performed, whereas in other cases the destination could be transitory and correspond to a point on a path through which the end effector is to traverse.

In this example, one or more destination positions are determined at step 300. The manner in which this is achieved will vary depending on the preferred implementation. In one example, destinations can be retrieved from a database or other data store, received from another processing system, determined based on signals from sensors or user input commands, or the like. For example, end effector destinations could be derived from a plan, such as a construction plan for a building, in which case the plan could be retrieved and the destinations derived from the plan. In this regard, the construction plan may identify positions at which objects such as bricks are to be placed in order for a building to be constructed. In this example, the destination positions can simply be retrieved from the plan.

However, this is not essential and alternatively, destination positions may need to be ascertained in other manners. For example, it may be necessary to retrieve an object from an environment, in which case the destination of the end effector corresponds to the object position. In this example, the object position may not be known in advance, in which case the position of the object may need to be detected, for example using a camera based vision system, or other localisation system, allowing the detected position to be used in order to define the destination position. In this regard, the object could be static or moving, meaning whilst the destination is normally static relative to the environment coordinate system ECS, in some examples, the destination could be moving.

It will also be appreciated that destinations could be determined in other appropriate manners, and the above described examples are not intended to be restrictive.

At step 310, a robot base path to allow for movement of the robot base 111 is optionally planned. The robot base path may not be required, for example in the event that the robot base 111 is static or already positioned. However, it will be appreciated that the robot base path may be used to move the robot base 111 to different positions within or relative to the environment E, in order to allow the end effector 113 to be more conveniently provided at the respective destination. The manner in which the base path is calculated will vary depending upon the preferred implementation and examples will be described in more detail below.

At step 320, an end effector path is planned to move the end effector 113 to the destination. The end effector path is typically planned based on a planned position of the robot base 111 relative to the environment E, for example to take into account movement of the robot base 111 along the robot base path. The end effector path may extend from an expected previous position of an end effector 113, for example at the completion of a previous interaction or other step, or could be calculated in real time based on a current end effector position. It will be appreciated that in the event that the destination is based on a current position, the end effector path could be a null path with zero length, with this being used for the purpose of positioning the end effector 113 statically relative to the environment E.

At step 330, the robot base 111 is optionally moved based on the robot base path, for example by controlling the boom assembly 140, or another form of robot base actuator. This process is typically performed in the robot base actuator coordinate system BACS, although this is not essential and robot base path planning and/or control of robot base movement could be performed in other coordinate systems. During and/or following this process, the commencement of end effector movement is performed at step 340, causing the end effector to start moving along the end effector path, assuming this is required. This process is typically performed in the robot base coordinate system RBCS, although this is not essential and end effector path planning and/or control could be performed in other coordinate systems.

As movement of the end effector 113 is performed, or otherwise if the end effector 113 is being held at a static position relative to the environment E, movement of the robot base is monitored at step 350, using the tracking system 120 to continuously detect a position of the robot base 111 relative to the environment E. This is used to adjust end effector movement, for example by adjusting pose of robot arm, at step 360 to ensure the destination position is reached.

In this regard, the robot base may undergo unintentional movement relative to the environment E, either due to a shift in the environment, or due to an unexpected movement of the robot base, resulting from vibrations in or wind loading of the boom, or the like. Such motions mean that the robot base may not be provided in an expected position relative to the environment, for example as a result of the robot base 111 deviating from the calculated robot base path. In this example, by monitoring movement of the robot base 111, such movements can be corrected for, ensuring that the end effector moves correctly along the end effector path to the destination position.

Thus, in one example, a robot base actuator is used to provide a coarse positioning system, whilst the robot arm provides a fine positioning system to allow an end effector to be accurately positioned relative to the environment. Operation is controlled by a control system that uses a tracking system to measure a position and optionally orientation of the robot base in real time, with a measured position (and orientation) of the robot base being used to calculate an offset that is added as a position transformation to the relative position of the fine positioning mechanism so that the end effector is positioned correctly relative to the environment. Thus a large and relatively light and flexible structure can be used to approximately position a fast and accurate fine positioning mechanism, which can be accurately controlled in real time allowing an end effector to be moved relative to an environment in an accurate and fast motion.

This form of operation is referred to by the applicant as dynamic stabilisation technology (DST) and is described in prior publications including U.S. Pat. No. 8,166,727, WO2009/026641, WO2009/026642, WO2018/009981 and WO2018/009986, the contents of which are incorporated herein by cross reference.

It will also be appreciated that DST can also be used to account for intentional movement of the robot base, for example to account for the fact that the robot base 111 may be traversing a robot path whilst an interaction is performed.

Figure 4:
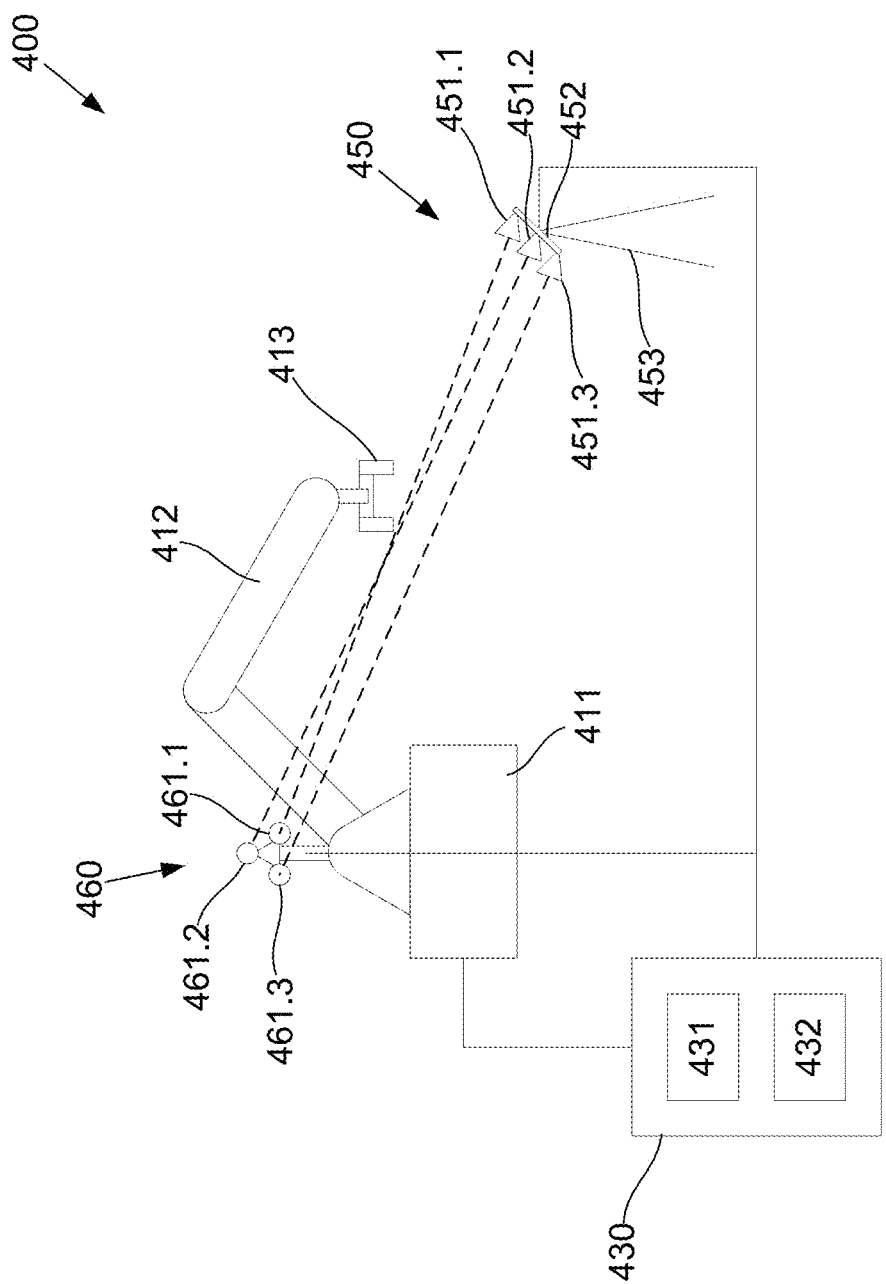
FIG. 4 is a schematic diagram of an example of a tracking system for tracking a robot base.
Figure 6A:
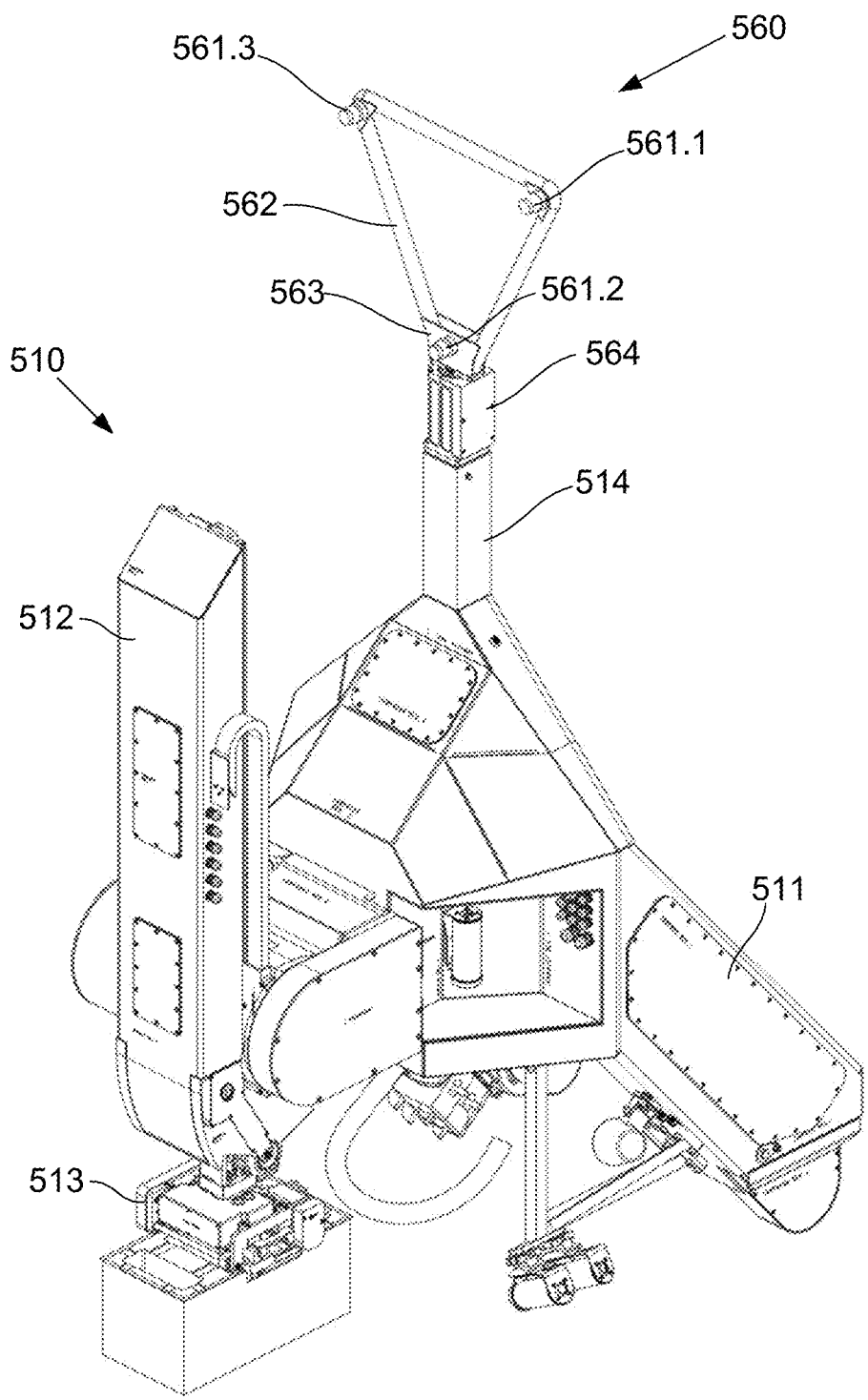
FIG. 6A is a schematic perspective view of an example of a robot arm including a tracking system target.
Figure 7D:
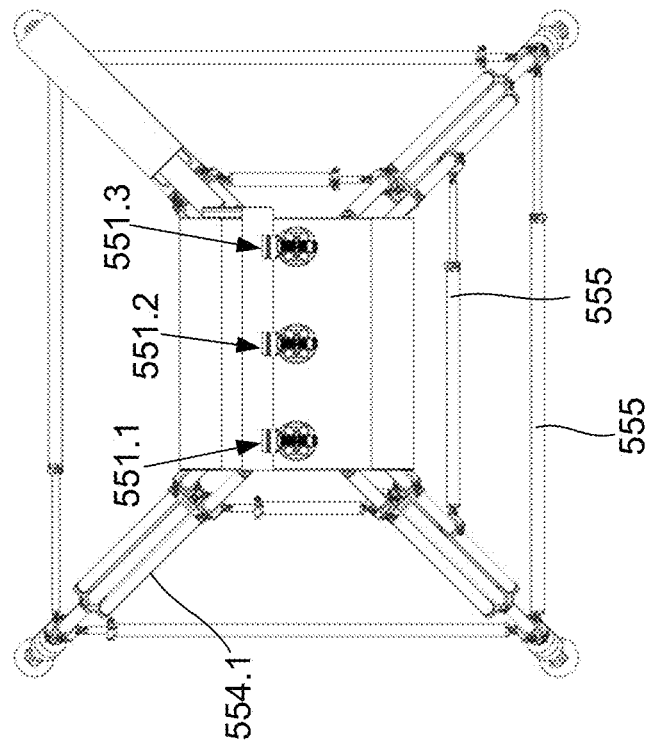
FIG. 7D is a schematic plan view of the tracking base of FIG. 7A.
Figure 7C:
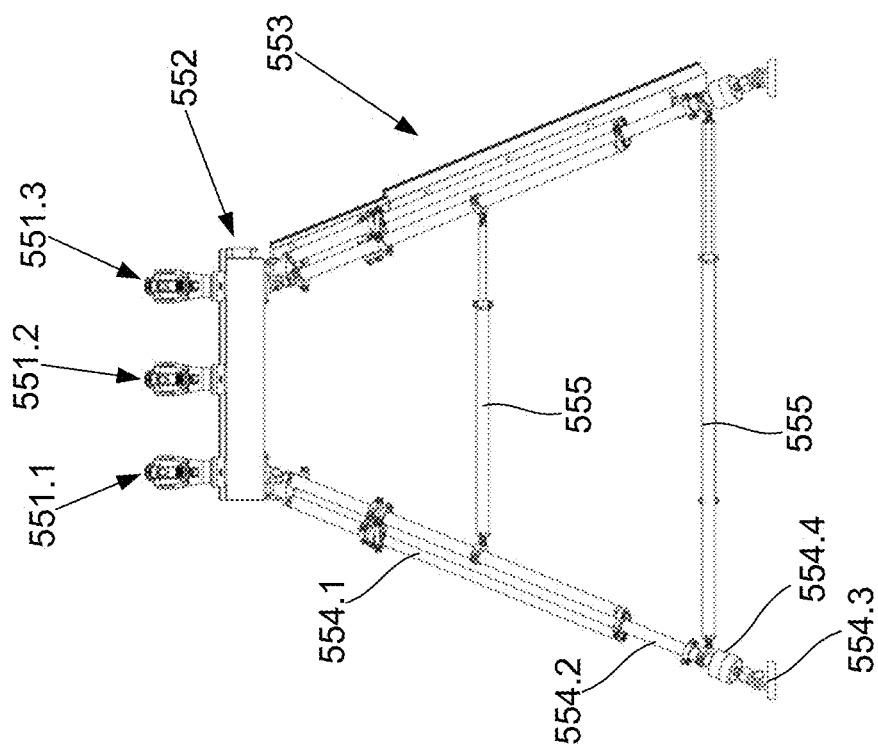
FIG. 7C is a schematic front view of the tracking base of FIG. 7A.
Figures 7E, 7F:
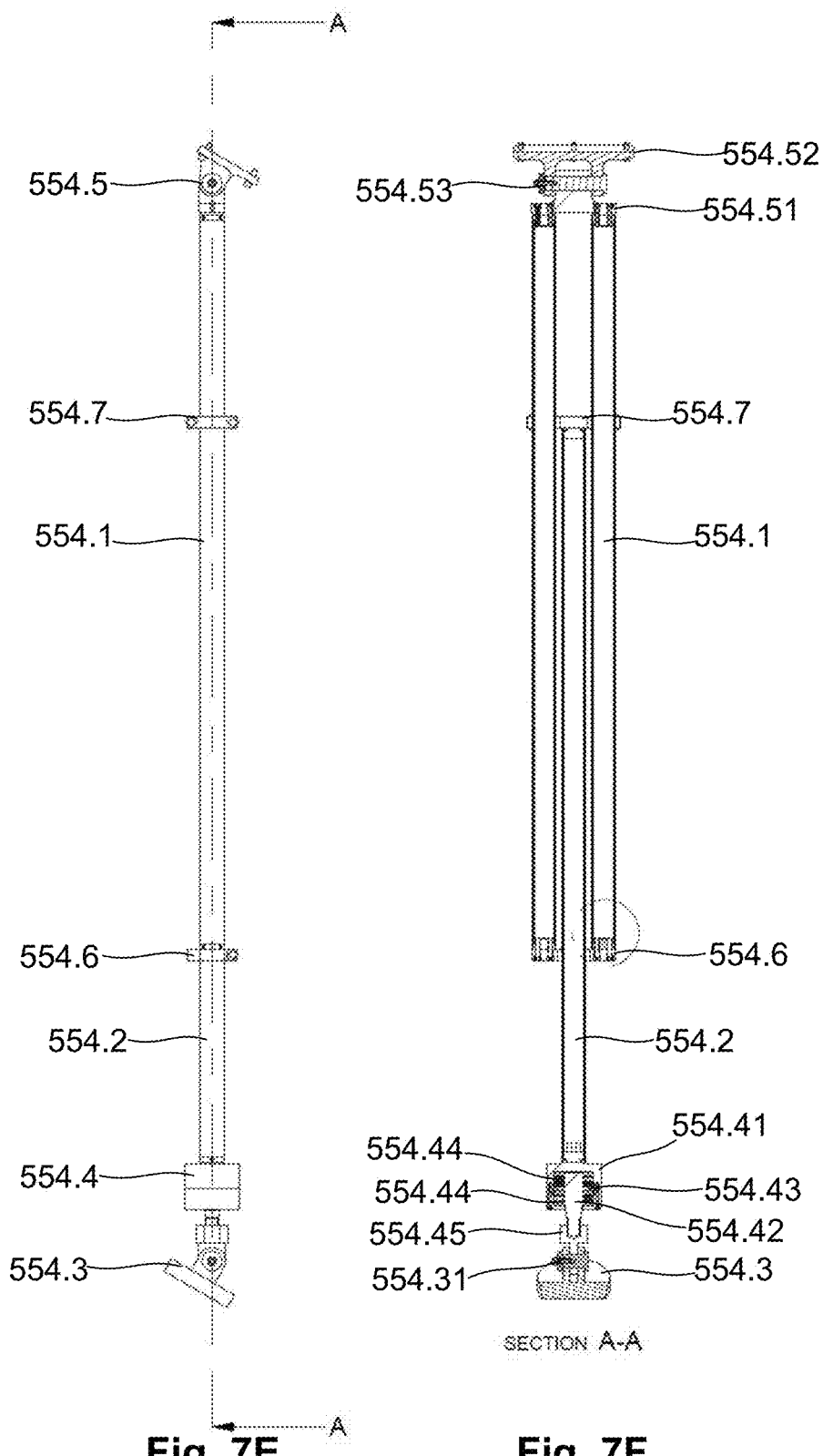
FIG. 7E is a schematic side view of an example of a leg of the tracking base of FIG. 7A.
FIG. 7F is a schematic cross-sectional view through line A-A' of FIG. 7E.
Figure 7G:
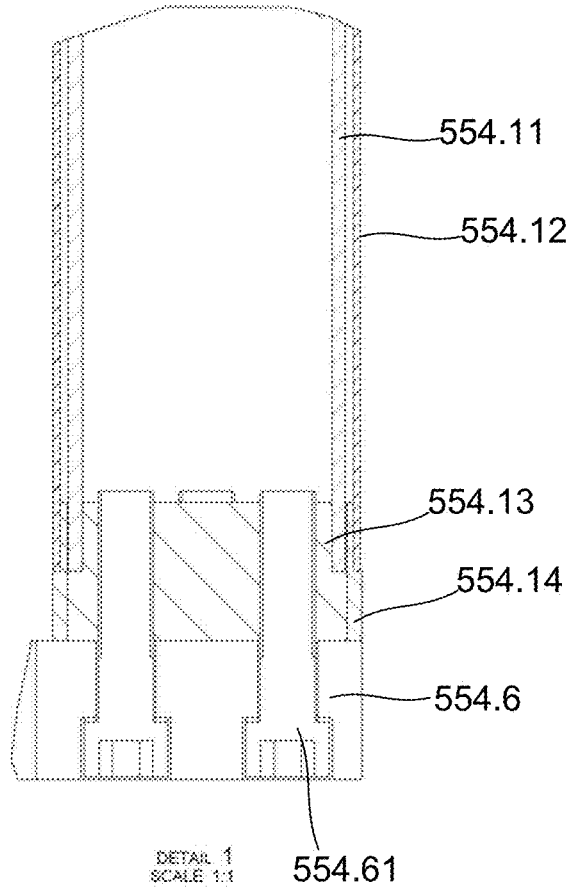
FIG. 7G is a schematic close up of an end piece of the leg shown in FIG. 7F.
Figure 7H:
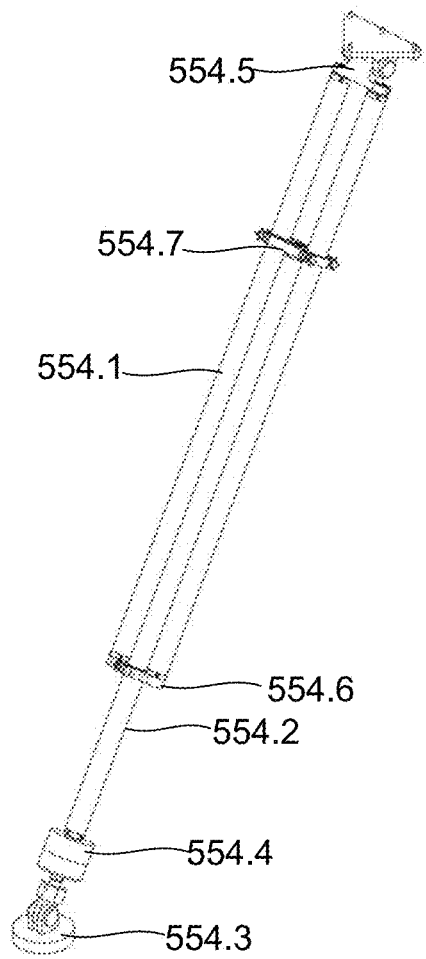
FIG. 7H is a schematic perspective view of the leg of FIG. 7E.

In order for DST to operate correctly, it is desirable to be able to accurately track the position and orientation of the robot base. Whilst a generic tracking system is described above, it will be appreciated that this is not necessarily able to accurately track orientation and in particular tilt of the robot base. Accordingly, an example of an improved tracking system will now be described with reference to FIG. 4.

For the purpose of this example, reference is made to a robot base similar to that described above with respect to FIGS. 1A to 1C, and similar reference numerals increased by 300 are used to denote similar features, which will not therefore be described in detail. However, whilst the following example is described with respect to tracking a robot base relative to an environment, it will be appreciated from the following that the tracking system could be applied in a wide range of different scenarios and could be used to track a wide range of different objects, not just robot bases. Accordingly, reference to robot bases is not intended to be limiting, and it will be appreciated that in practice the techniques described herein could be used to track a wide range of different objects that undergo movement relative to an environment.

In this example, the tracking system includes a tracking base 450 that is provided in the environment and a target system 460 that is attached to the object, and in particular the robot base 411.

The tracking base 450 typically includes at least three tracking heads 451.1, 451.2, 451.3, mounted to a tracking head support 452. The support 452 can be used to help maintain the tracking heads in a fixed relative position, which can in turn assist with interpreting signals from the tracking heads and hence determining the position and orientation of the robot base 411. The support 452 can be of any appropriate form but in one example is a platform supported by legs 453, allowing the platform to be elevated within the environment, and thereby ensuring line of sight can be maintained between the tracking heads and target system. However, it will be appreciated that this is not essential and any support could be used depending on the preferred implementation.

Each tracking head 451.1, 451.2, 451.3 typically includes a radiation source to send a radiation beam to a respective target and a base sensor that senses reflected radiation. Example tracking heads are known and commercially available, such as the API Radian laser tracker, and operation of the tracking heads will not therefore be described in further detail.

The tracking base 450 also includes at least one tracking head actuator that controls an orientation of the tracking heads and at least one tracking head angle sensor that monitors an orientation of the tracking heads. The tracking heads may be moved collectively using a single actuator, for example by moving the support, in which case a single sensor and actuator may be used, although more typically the tracking heads are moved independently, in which case respective actuators and angle sensors are provided. It will be appreciated that in one example, this is achieved using actuators and sensors forming part of the commercially available tracking heads. In either case, actuators can be provided for adjusting a rotation (heading or azimuth) and tilt (pitch), with corresponding sensors being provided.

As previously mentioned, the system further includes a target system 460, which includes at least three targets 461.1, 461.2, 461.3 that are mounted to the object. The targets could be mounted directly to the object, in this case the robot base, although more typically the targets are mounted to a target support, as will be described in more detail below.

Each target includes a reflector (e.g. a spherically mounted retroreflector (SMR)) that reflects the radiation beam (e.g. laser) to the base sensor of the respective tracking head 451.1, 451.2, 451.3. It will be noted that each target may also include a target sensor that senses a radiation beam from a respective tracking head 451.1, 451.2, 451.3, although this may not be required if the target is a passive instrument which does not mutually track the tracking head.

Optionally, at least one target actuator is provided that controls an orientation of the targets and at least one target angle sensor is provided that monitors orientation of the targets. Whilst the targets could be moved independently, more typically the targets are moved collectively using a single actuator, with a single angle sensor being provided. Furthermore, although actuators could be provided for adjusting a rotation (heading) and tilt (attitude), more typically only rotation is required as a result of the robot base 411 operating over a limited vertical range. In a further example, movement of the targets may not be required, in which case the target actuators and angle sensors may not be required, as will be described in more detail below.

A controller 430 is provided, which typically includes a processor 431 and memory 432. The controller 430 is configured to cause each tracking head to track a respective target as it moves throughout the environment. The controller 430 then determines a position of each target with respect to a respective tracking head at least in part using signals from each base sensor; and, the at least one tracking head angle sensor. An orientation of the target system is then determined by the controller 430 using at least in part the determined position of each target; and finally the position and orientation of the object is determined at least in part using the position and orientation of the target system.

Accordingly, the above described arrangement uses multiple tracking heads and targets in order to perform tracking of an object, such as a robot base, relative to an environment.

It will be appreciated that in contrast to arrangements in which a single tracking head and corresponding target is used, the use of multiple tracking heads and targets can provide greater positional accuracy, and/or allow orientation information to be derived mathematically. In this manner, orientation is not directly measured but instead calculated from the position data. This overcomes issues with existing orientation measurement systems that use cameras and the like to obtain images of targets and then perform image processing which introduces latency into the measurements.

In one particular example, through suitable configuration of the tracking heads and/or targets the above arrangement can allow a position of an object, such as a robot base to be determined with six degrees of freedom, including determining an X, Y, Z coordinate position and determining pitch, yaw and roll orientation.

Typically, the position of each target is determined using a distance measurement obtained from the base sensor and elevation and azimuth angles obtained from the at least one tracking head angle sensor. Furthermore, signals from a base sensor of a respective tracking head are used to control the at least one tracking head actuator to ensure that the tracking head tracks the target as it moves throughout the environment.

Typically, in order to perform interactions within an environment, it is desirable to obtain the position and orientation of the object in an environment coordinate system. In the case of a bricklaying robot, this may represent a building slab coordinate system in which an ideal position of a bricklaying and adhesive applying head of the robot is provided in order to place a brick at a desired position and orientation relative to the slab.

Typically, the position of each target is determined relative to a local coordinate system of the respective tracking head. In one example, a first tracking head defines a tracking base coordinate system and the position measurements of at least second and third tracking heads are transformed into the tracking base coordinate system using tracker calibration data. Accordingly, the position of each target is then specified in the same coordinate system. The tracker calibration data typically defines the geometric relationship between the local coordinate systems of each respective tracking head and may be obtained by getting each tracking head to survey the same targets placed in the environment.

The control system then typically determines the position of each target in an environment coordinate system using environment calibration data. Typically, the environment calibration data defines the geometric relationship between the tracking base coordinate system and the environment coordinate system. In the case of a bricklaying robot, this may define the offset (in translation and rotation) between the tracker base coordinate system and a building slab coordinate system.

The position of each target in the environment coordinate system is then used to define position vectors and a vector cross product is calculated to define a normal vector to a plane of the target system which defines the orientation of the target system in the environment coordinate system. Then, the position and orientation of the target system is transformed into the position and orientation of the object using target system calibration data which defines the geometric relationship between the target system and the object.

In an alternative example, each tracking head is calibrated relative to the environment coordinate system such that the control system transforms positional data from each tracking head directly into the environment coordinate system.

Typically, the control system compares the determined position and orientation of the object with a desired position and orientation of the object and calculates a compensation vector in accordance with results of the comparison. This compensation vector may then be used by the control system to correct the pose of the object in order to perform the interaction in the environment as programmed.

A number of further features will now be described with reference to a specific example of a tracking system configured for use on a brick or block laying machine, as shown in FIGS. 5A to 5C.

In this example, a block laying and adhesive applying head 510 of a robotic block laying machine is provided having a robot base 511, a robot arm 512 and an end effector 513. The robot base 511 is typically attached to a robot base actuator, such as the end of a boom, in a manner similar to that described above with respect to FIGS. 1B and 1C.

In this example, a target system 560 is mounted to the robot base 511 allowing a position and orientation of the robot base relative to an environment E to be tracked. The tracking system further includes a tracking base 550 having a platform 552 supported by legs 553. The boom is typically a slewing boom that is mounted to a truck base and which is telescopically extendible and foldable.

In this example, the tracking base typically includes three tracking heads 551.1, 551.2, 551.3 with the target system 560 including three corresponding targets 561.1, 561.2, 561.3. The use of three tracking heads and three targets is particularly useful as this allows for determination of the position and orientation of the robot base 511, with six degrees of freedom, although this is not essential and alternatively other numbers of tracking heads and/or targets could be provided depending upon the preferred implementation.

For example, a single tracking head could be used with three targets. However this requires that the tracking head scans each target consecutively, resulting in a significantly lower sampling rate for each target, both due to the time taken to refocus the tracking head and acquire the target, and also by virtue of the fact that targets are sampled less often. It will be appreciated that this therefore would not produce the same degree of accuracy, and will also have a significantly higher latency, making this less useful for applications such as DST.

As mentioned above, the targets 561.1, 561.2, 561.3 are provided in fixed relative target positions with the tracking heads 551.1, 551.2, 551.3 also being provided in fixed relative tracking head positions. This allows the control system to determine the position and orientation of the object in accordance with the fixed relative target and tracking head positions.

In one particular example, the targets 561.1, 561.2, 561.3 are spaced apart in two dimensions with the tracking heads 551.1, 551.2, 551.3 being spaced apart in a single dimension, although other configurations, such as spacing the tracking heads 551.1, 551.2, 551.3 in two dimensions could be used. Utilising at least one of the targets or tracking heads spaced in two dimensions allows a pitch, yaw and roll of the object relative to the environment to be determined, thereby allowing tracking over six degrees of freedom.

It will be appreciated that different configurations, and in particular different spacings of tracking heads 551.1, 551.2, 551.3 and targets 561.1, 561.2, 561.3 could be used, depending on the preferred implementation. In particular, this will depend on factors, such as the degree of accuracy required, size constraints, environmental factors, or the like. For example, a greater spacing of targets and tracking heads allows a greater degree of resolution to be achieved. However, this will increase the overall magnitude of the tracking base and target arrangement, making this unsuitable for some applications, and potentially leading to issues such as increased impact of external disturbances, such as vibrations, wind loading, or the like.

Additionally, a greater spacing of tracking heads 551.1, 551.2, 551.3 or targets 561.1, 561.2, 561.3 will increase the effect of thermal expansion of the respective support, leading to a greater relative movement of the tracking heads or targets for a given amount of thermal expansion, which can in turn make measurements less accurate.

Accordingly, taking these factors into account, in one particular example the tracking heads 551.1, 551.2, 551.3 are spaced apart by between 100 mm and 1000 mm, between 250 mm and 750 mm and about 500 mm, with a similar spacing being used for the targets 561.1, 561.2, 561.3.

However, this is not essential and other arrangements could be used depending upon the preferred implementation.

In one example, the multiple targets 561.1, 561.2, 561.3 are mounted on a target support. It will be appreciated that this is not essential and alternatively the targets could be attached directly to the object. However, mounting the targets 561.1, 561.2, 561.3 on a separate target support ensures that a desired configuration of targets is maintained, and also allows the targets 561.1, 561.2, 561.3 to be moved collectively.

An example of this is shown in more detail in FIGS. 6A to 6D.

In this example, the multiple targets 561.1, 561.2, 561.3 are mounted in a plane and spaced apart in two dimensions with the target support being formed from a triangular frame 562, with a target mounted proximate each apex of the frame. Whilst not essential, this arrangement is particularly beneficial as it ensures that the targets 561.1, 561.2, 561.3 are equally spaced with respect to each other. This also minimises a volume of material present in the target support, whilst maintaining a rigid shape, which can reduce the impacts of external forces, such as wind loading, whilst allowing the targets to maintain a predefined fixed relative configuration.

Additionally, in this example, the target system 560 is mounted on a mast 514 projecting upwardly from the robot base 511. An end of the mast 514 is attached to a target mounting 564, which incorporates a target actuator drive motor, allowing rotation of the target system to be performed. The target system includes a bracket 563 that attaches the triangular frame 562 to the drive motor.

Thus, in this example, the target support 562 can be rotatably mounted to the object, allowing the control system to control the target actuator to rotate the target support in accordance with the position of each target 561.1, 561.2, 561.3 relative to the tracking base 550, thereby ensuring that the targets 561.1, 561.2, 561.3 are orientated towards the tracking base.

In this example, the targets 561.1, 561.2, 561.3 are only rotated about a single axis, corresponding to the $Z_{RB}$ axis of the robot base coordinate system RBCS, to thereby change a heading of the targets. This is due to the fact that in the current example the robot base 511 can undergo significant lateral movement relative to the tracking base 550, but typically will undergo only minimal vertical movement, meaning that the targets can be tracked without changing an attitude or tilt of the targets. Nevertheless it will be appreciated that this is not essential and alternatively, the target support could be adapted to rotate about multiple axes utilising a suitable actuator configuration.

In one example, the tracking heads 551.1, 551.2, 551.3 are mounted to a tracking head support in the form of a platform 552, which in one example, is supported in an elevated position via one or more legs 553. In one example the platform is elevated to a height that is at least one of between 2 m and 4 m, between 2 m and 3 m and at least 2.5 m. This can be used to ensure that the platform is elevated to a height that is sufficient to ensure that line of sight is maintained between the tracking heads 551.1, 551.2, 551.3 and the targets 561.1, 561.2, 561.3, irrespective of obstacles in the environment, including partially constructed walls of a building structure.

A specific example of a support arrangement will now be described in more detail with reference to FIGS. 7A to 7H.

In this example, the platform 552 is a rectangular platform, with a leg 553 extending from each corner, although it would be appreciated that other arrangements, such as three legged "tripod" arrangement could be used.

The platform 552 includes an inner structural platform core and an outer platform heat shield spaced from the platform core. The legs and tracking heads 551.1, 551.2, 551.3 are mounted to the platform core, with the heat shield being used to shield the platform core and thereby reduce thermal expansion, which can unduly influence the relative positioning of the tracking heads 551.1, 551.2, 551.3.

The effects of thermal expansion can additionally and/or alternatively be reduced using other approaches, including but not limited to the use of materials with a low thermal expansion coefficient, such as carbon fibre, or the like, or the use of heat resistant or reflective coatings, such as ceramic paints. In another example, active temperature control could be performed by circulating a heat transfer medium, such as water or the like, through the structure to maintain a fixed temperature.

In one example, each leg 553 includes at least one leg member with each leg 553 typically including a pair of parallel spaced upper leg members 554.1, held in position via respective connectors 554.5, 554.6 provided proximate each end, with an upper connecting bracket being hingably mounted to the platform core 554.5. A single lower leg member 554.2 is slideably mounted within the lower connecting bracket 554.6, between the upper leg members 554.1. The lower leg member 554.2 can also include a guide member 554.7 attached proximate an upper end of the lower leg member, which is slideably mounted on the upper leg members 554.1 to allow for the lower leg 554.2 to slide relative to the upper leg members 554.1.

This configuration allows the legs 553 to be extended, with the platform 552 optionally including a levelling indicator, such as a spirit level and/or bullseye, allowing the legs to be extended to thereby provide the platform in a level orientation relative to the environment.

Each leg member 554.1, 554.2 typically includes an inner structural leg tube 554.11 and an outer leg heat shield 554.12, with the leg heat shield acting to prevent thermal expansion of the structural leg tube, which in turn can help avoid movement of the platform, for example resulting from differential thermal expansion of the legs. Spacing the heat shielding from the core also allows for airflow between the core and shield, which can assist in maintaining a constant core temperature, and thereby mitigate thermal expansion.

This arrangement is particularly beneficial as it can provide a high degree of strength whilst maintaining a light weight configuration, avoiding the legs and platforms moving under wind loading, thermal expansion, or the like.

A number of further features will now be described.

Each tracking head can be rotatably mounted to the platform, allowing the control system to control a tracking base actuator associated with each tracking head 551.1, 551.2, 551.3 to rotate the tracking heads 551.1, 551.2, 551.3 in accordance with the relative position of each respective target, thereby tracking the targets 561.1, 561.2, 561.3 as they move in the environment.

Whilst the mounting may allow solely for rotation about the $Z_{RB}$ axis, to change a heading of the tracking bases 551.1, 551.2, 551.3, more typically the tracking heads 551.1, 551.2, 551.3 are pivotally mounted to a mounting, which is then in turn rotatably mounted to the platform, allowing a pitch of the tracking heads 551.1, 551.2, 551.3 to be adjusted. More typically however, the tracking heads are rigidly mounted to the platform and the tracking base actuator (s) controlling rotation and pitch of the tracking head are provided within the head itself (for example a typical laser tracker).

In this example, as shown in FIG. 7B, each tracking head includes a mounting 556.1, which is attached to the platform 552 and supports a clevis 556.2 rotationally attached to the mounting 556.1. The clevis further supports a sensor unit 556.3 which is pivotally mounted to the clevis, allowing a pitch of the sensing unit 556.3 to be adjusted. The sensing unit includes a window 556.4 which is used to transmit and receive laser beams. It will therefore be appreciated that in this instance each tracking head can comprise an API Radian laser tracker or similar.

Each leg member 554.1, 554.2 typically includes leg end pieces, including an inner plug 554.13 that engages the leg tube 554.11 and an outer plug 554.14 that engages the outer heat shield 554.2. The outer plug and heat shield are typically configured so that the heat shield floats on the outer plugs to thereby accommodate thermal expansion of the outer heat shield without altering the overall leg length.

Connecting brackets 554.5, 554.6 can be attached to the leg end pieces of the upper leg members, to support the leg members in a spaced apart arrangement. The upper connector 554.5 includes a body 554.51 which is connected to the leg member 554.1, and in particular the leg end pieces, and which is connected to a mounted bracket 554.52 via a hinge 554.53. In use the mounting bracket 554.52 is connected to an underside of the platform in particular using fasteners that extend through the heat shield to the platform core thereby hingeably mounting the legs to the platform.

Similarly, the connecting bracket 554.6 is connected to leg end pieces to support lower ends of the upper leg members 554.1, and includes an opening into which the lower leg member 554.2 is slidably mounted. The lower leg member 554.2 is also attached via an upper leg end piece, to the guide 554.7, which includes openings into which the upper leg members 554.1 are slidably mounted, allowing the lower leg member to slide relative to the upper leg members 554.1.

In one example, the lower leg member 554.2 can be attached to a foot 554.3 for engaging the ground and may further include a shock absorber 554.4 mounted between the foot and the leg to reduce transmission of vibrations from the ground to the platform. The shock absorber 554.4 can include a housing 554.41, attached to leg end pieces attached to a lower end of the lower leg member 554.1. The housing 554.41 contains a shaft 554.42, having a flange 554.43 extending laterally outwardly part way along the shaft length. The shock absorber housing 554.41 contains damping members 554.44, such as deformable rubber pads, springs or the like, which are positioned above and below the flange 554.43. The shaft 554.42 is attached to a coupling 554.45 which is then attached to the foot 554.3 via a hinge 554.31.

In this example, as the shaft 554.42 moves relative to the housing 554.41, the damping members 554.44 absorb energy acting to thereby damp vibrations transmitted through the shock absorber. This is particularly important in environments such as construction locations where heavy machinery can cause significant ground vibrations with transmission of these to the platform and hence tracking heads resulting in significant uncertainty and inaccuracies in measurement of the position and orientation of the object.

The legs 553 are interconnected via lateral struts 555. Each lateral strut includes inner and outer telescopic tubes 555.1, 555.2 which include end brackets 555.3 which can be clamped to respective legs. A locking member 555.4 is used to lock the inner and outer tubes 555.1, 555.2 in a particular position so that the legs are rigidly supported, which again helps to prevent undue movement of the legs.

The above described arrangements can ensure that in wind loading of up to 5 metres per second the platform undergoes a rotation that is less than about ±0.01 degrees, ±0.05 degrees and more typically ±0.001 degree.

It will be appreciated from this that the tracking base support can be used with a wide variety of different sensing arrangements, and is not limited to use with a tracking system. For example, the tracking base support could be used as a camera tripod to provide a highly stable platform suitable for use in long exposure photography, filming, or similar.

In this example, a sensor support for supporting a sensing arrangement can be include a platform that supports the sensing arrangement with the platform including an inner structural platform core and outer platform heat shield spaced from the platform core. A number of extendible legs can be coupled to the platform core that support the platform in an elevated position relative to an environment with each leg including a pair of parallel spaced apart upper leg members interconnected approximate each end via connecting brackets with an upper connecting bracket being hingeably mounted to the platform core. A single lower leg member is then slideably mounted between the upper leg members within a lower connecting bracket with each leg member including an inner structural leg tube and outer leg heat shield.

This particular arrangement provides a platform that is highly stable even under wind loading and which furthermore undergoes minimal movement even when subject to changing ambient conditions, such as changes in incident solar radiation.

Figure 8:
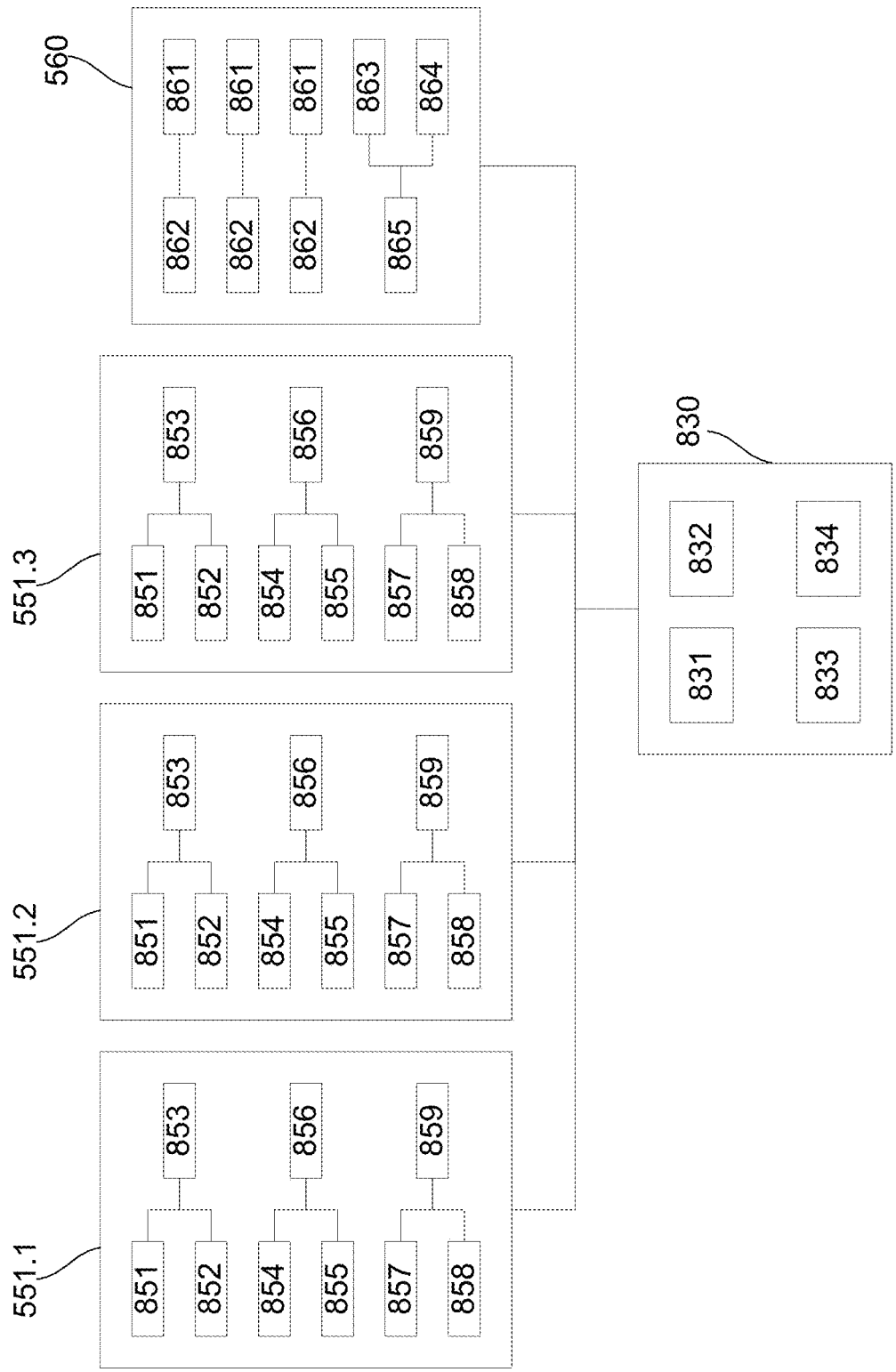
FIG. 8 is a schematic diagram of a specific example of a tracking system controller.

An example of a control system for the above described arrangement will now be described in more detail with reference to FIG. 8.

In this example, each tracking head 551 includes a laser 851 and corresponding sensor 852, which is used to sense reflected radiation. In this instance, the laser 851 and sensor 852 are connected to a laser controller 853, which controls operation of the laser 851 and interprets signals from the laser beam, for example to calculate a distance between the tracking head and a corresponding target. The tracking heads further include a heading actuator 854, heading sensor 855 and heading controller 856, as well as a pitch actuator 857, pitch sensor 858 and pitch controller 859, for controlling a heading and pitch respectively.

The target system 560 includes target sensors 861 and optionally corresponding controllers 862 for each target, as well as a heading actuator 863, heading sensor 864 and heading controller 865, which can control a target system heading based on signals from the target sensors 861. Such a target arrangement may be required when one or more targets are mounted to a controllable pan/tilt mount. In a passive target arrangement, the targets would be provided without controllers or actuators.

A controller 830 is provided, which is broadly similar to the controller described above with respect to FIG. 2, and which includes one or more processing devices 831, one or more memories 832, an input/output device 833 and interface 834, which can be utilised to connect the control system 830 to the tracking heads and optionally the target system.

In use, the processing device 831 executes instructions in the form of applications software stored in the memory 832 to allow the required processes to be performed. In particular, this typically involves receiving signals from the angle sensors and base sensor, and using these to control the tracking head actuators 854, 857 and optionally target actuator 863, and calculate the position and orientation of the object.

When controlling the tracking heads 551 and optionally the target system, this operation can be performed solely within the controller 830, and or could be performed at least partially within the tracking head and target. For example, the laser controller 853 could analyse signals from the sensor and determine a relative heading and pitch of the corresponding target and provide signals to the heading and pitch controller 856, 859, allowing tracking to be performed solely within the tracking head.

Similarly in the event that the targets are active targets (e.g. on pan and/or tilt mounts) the target controller 862 can be used to determine a relative tracking head heading using signals from the sensor 861, and provide this to the heading controller 865, allowing the heading actuator to be controlled.

In use, the at least three tracking heads are firstly calibrated to determine the offsets (both translation and rotation) between the tracking heads themselves. The calibration is done by placing a number of optical targets (such as SMRs) in the environment around the trackers and getting all of the trackers to simultaneously look at one of the SMRs. This is repeated for each calibration point to allow the tracker offsets to be determined. In the case of a construction site, the tracking heads are then calibrated to the building slab by at least one tracking head taking measurements of SMR positions placed around the slab so as to locate the ground plane of the slab (origin and X, Y axes). When the block laying robot is in operation and the robot base (i.e. block laying and adhesive applying head) is moving throughout the environment, the tracking system determines position data indicative of the measured target positions of each target in a local coordinate system of each tracking head. These measurements are typically then adjusted using the tracker calibration data and transformed into a tracking base coordinate system so that each position is expressed in a common coordinate system. The position data is then transformed into position coordinates in the slab or environment coordinate system using the slab calibration data. Finally, the position of the robot base is determined using target calibration data (offsets between the target system and robot base coordinate system).

This data provides the position of the robot base in real time (e.g. data rate of 1 kHz). At least three positional coordinates are determined which is sufficient to define a plane allowing a normal vector to be determined which defines the orientation of the plane in 3D space (and thereby the orientation of the robot base). Defining one point as an origin, two vectors can be determined from the origin to the other two points respectively. The cross product of these two vectors provides the normal vector to the plane.

The ideal or desired robot base position and orientation is known and represents the pose required to lay the next block in the correct position. The required translation and rotation to move from the actual pose to the desired pose is then calculated using any suitable technique for aligning vectors in 3D space. The rotation transformation is typically determined using Euclidean matrix or quaternions or a combination of both. The representations of rotations by quaternions are more compact and quicker to compute than the representations by matrices, and unlike Euler angles they are not susceptible to "gimbal lock".

The determined difference (i.e. transformation) returns 6DOF vector representing the 3DOF position and 3DOF rotation transformation required to move to the desired pose. This data may be fed into the control system as a compensation input for example to implement the dynamic stabilisation (DST) as described earlier.

It is to be appreciated that as the spacing of the targets (i.e. size of the triangle) increases the orientation accuracy increases as the plane defined by the three points is more accurately defined. However, a larger spacing may require a larger support structure which must be rigid and could be subject to increased vibration which can reduce measurement accuracy.

In the above described examples, the targets are mounted on the target support, which can then be rotated so that the targets collectively track the position of the tracking heads. However, this is not essential and alternatively, the targets can be mounted independently. Examples of this will now be described in more detail with reference to FIGS. 9A to 10B.

In these examples, a robot base 911 is provided, including a robot arm 912 and end effector 913. It will be appreciated that this arrangement is generally similar to the examples described above and will not therefore be described in any further detail.

Figure 9A:
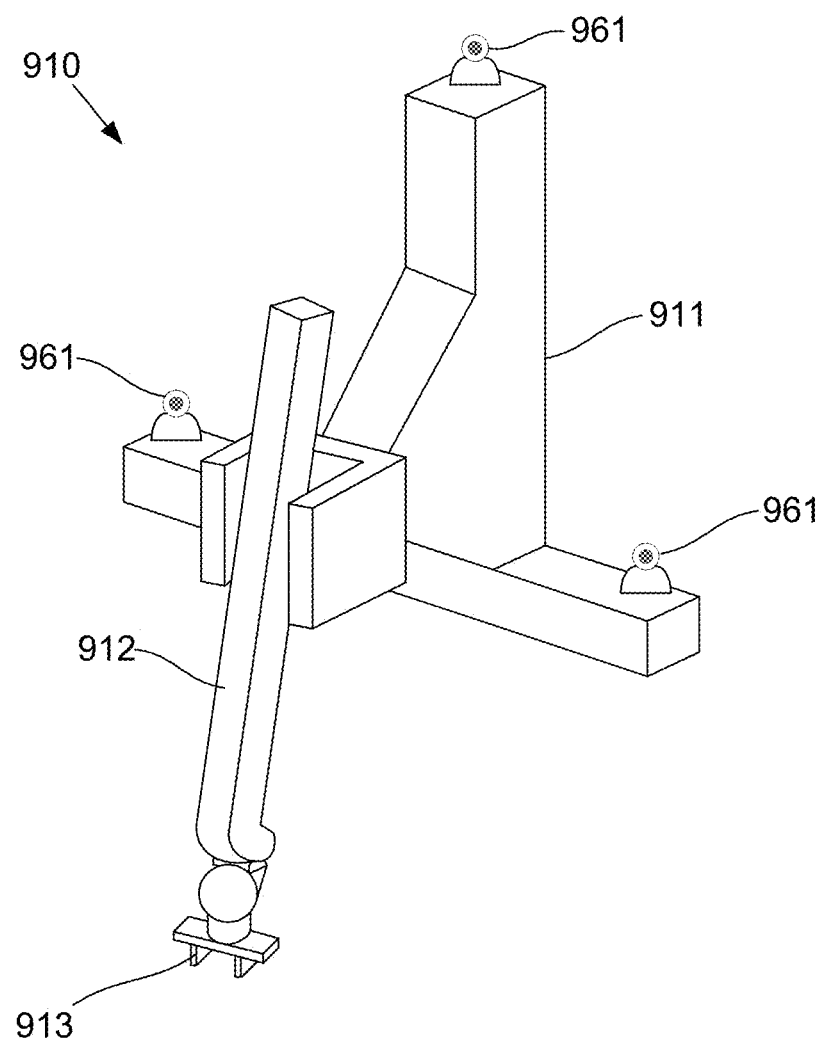
FIG. 9A is a schematic perspective view of a further example of a robot base including a target configuration.

In the example of FIG. 9A, three targets, such as SMRs are mounted on the base 911 and operable to pan about a pan axis. The targets are mounted in a plane and spaced apart in two dimensions, in a manner similar to that described above with respect to the target support. In this example, the targets are mounted using respective mountings, each of which rotates to track the laser beam from a respective tracking head.

Figure 9B:
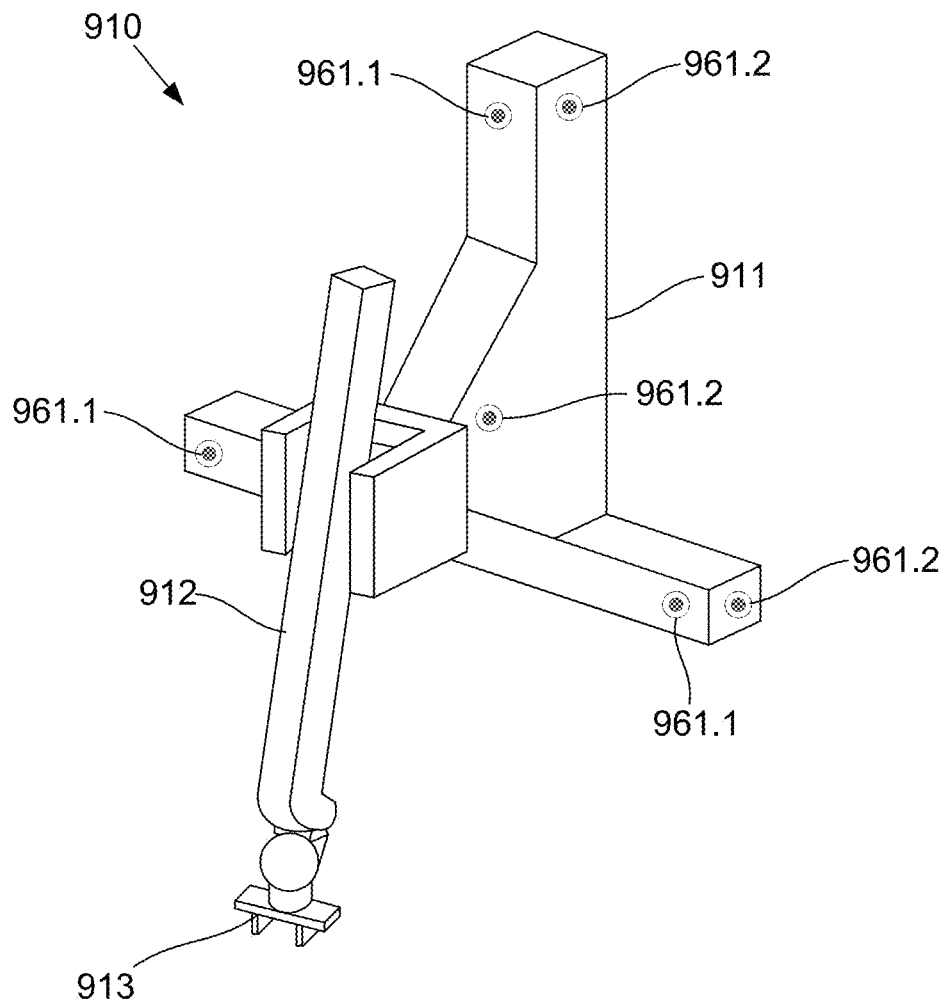
FIG. 9B is a schematic perspective view of a further example of a robot base including a target configuration.

In the example of FIG. 9B, static targets, such as SMRs are used which are simply affixed to the robot. In this instance, each target has a field of view of about 90 degrees, which means that if the target changes orientation by more than 90 degrees, it will no longer be able to function. Accordingly, in this example, three targets 961.1 are mounted on a front face of the robot base 911, whilst three targets 961.2 are mounted on a side face of the robot base 911. It will also be appreciated that three targets (not shown) may also be mounted on a second side face. In each case, the targets are arranged so that they are spaced apart in at least two dimensions, although it will be appreciated that the particular configuration will depend on the physical construction of the robot base. In any event, in this instance, as the robot base rotates relative to the tracking heads, as one set of targets moves out of the field of view of the tracking heads, the tracking heads must refocus on a different set of targets. This means that the collection of position and orientation data is interrupted, which in turn means that tracking cannot be performed continuously. Accordingly, in this situation, it may be necessary to control this process so that switching to a different target occurs during a non-critical phase of operation. For example, in the case of laying a brick, switching between targets may need to occur between brick laying operations, such as when a brick is retrieved, and not during the laying operation. Alternatively, an additional tracking head may be used to ensure that at least three targets are tracked continuously at all times and the targets are shifted one at a time without tracking interruption.

Accordingly, the above described approaches make use of existing laser tracking systems, such as an API radian or Leica AT960, which already support data output at 1 kHz or 1 ms intervals with low latency. The system operates by measuring the position of multiple, and more typically, at least three targets, which are provided in a defined target configuration, to allow position and orientation to be more accurately measured. Adding additional trackers and targets improves accuracy by increasing the number of data points for a best fit.

For example, at 30 m distance for an API OT2 tracker, the typical volumetric accuracy of the OT2 position measurement is about 0.165 mm. Part of the error is due to the angular accuracy of 3.5 µm/m and partly due to the distance accuracy of ±15 µm+0.7 µm/m. This is partly due to atmospheric variations and therefore the conditions are similar for three different trackers with close beam paths and the three trackers tend to give similar measurements much closer than the theoretical 0.165 mm error. The dimensions of the target configuration are known and thus the position and orientation of the targets can be best fit to minimise the error of each individual tracker resulting in an accurate position and orientation measurement.

In one particular example, if three targets are mounted in an equilateral triangle configuration, measuring 600 mm on each side, at 30 m range the position error is approximately 0.05 mm and the orientation error is about 0.003 degrees. The orientation error can also be further reduced by increasing the size of the triangular target as previously discussed.

For example, the size of the triangular target area can be increased by mounting each target on its own actuated mounting, allowing the targets to be moved independently. However, in some usage scenarios this suffers from the drawback that it is often difficult to maintain line of sight between the tracking heads and targets, meaning this arrangement may not be practical in all circumstances. Another option is to rigidly mount multiple targets to the robot base. However, again the tracking heads must maintain line of sight to the targets or be programmed to switch to alternative targets if line of sight is lost, or is going to be lost. Whilst this can result in a loss of tracking, the impact of this can be minimised by switching between targets at an appropriate time, or by using more tracking heads, so that tracking heads can switch between targets at different times, so that three tracking heads are operational at any one time.

In one preferred embodiment, the tracking heads are mounted on a base including a platform supported in an elevated position by a number of legs. In one example, the platform can be oriented diagonally to a line of sight to a mid-point of the working area so that all trackers maintain line of sight to the targets throughout the working area. Additionally and/or alternatively, the platform can be configured to rotate so that the tracking heads can track through a greater range without interfering with each other.

In another example, the tracking heads can be vertically offset, which can assist in maintaining line of sight. This can be achieved using an angled or stepped platform so that the tracking heads are vertically and horizontally offset, or could be achieved by spacing the tracking heads vertically above each other, which can help maintain line of sight, at the expense of making the support structure more complex.

Thermal deflection of the mounting structure can introduce measurement errors. Accordingly, in one example, thermal deflection is minimised by building the support, including the platform and/or legs, from low thermal expansion materials such as Invar or Carbon fibre. The mounting structure can be provided with heat reflective coating, such as a white ceramic paint and/or may be provided with heat shielding to minimise thermal effects. In one particular example, heat shielding is provided which is physically spaced from a core, allowing airflow and hence ventilation between the heat shield and core, helping to maintain an even temperature.

In a further example, it is also possible to circulate a heat transfer medium, such as water or cooling fluid, through the structure to maintain even temperature and/or heat or cool the structure to maintain a constant temperature. It is also possible to build a thermally compensating structure using long lengths of low expansion material that are compensated by directionally opposite short lengths of high expansion material in the manner of a Gridiron Pendulum.

In any event, by mounting the three targets on a frame that is rotated (yawed or panned) by a motor, the orientation of the targets can be optimised and the targets can be displayed to the tracking heads, even as the base they are mounted to changes orientation. It will be appreciated that for many applications, the range of vertical movement of the robot base is limited, meaning the targets do not need to be rotated about a horizontal axis, for example to change an elevation, tilt or attitude, but this is not essential, and in some examples, elevation tracking may also be performed, using a pan and tilt arrangement.

A further example of a tracking system shall now be described with reference to FIGS. 10A to 10B, 11A to 11C and 12.

Figure 10A:
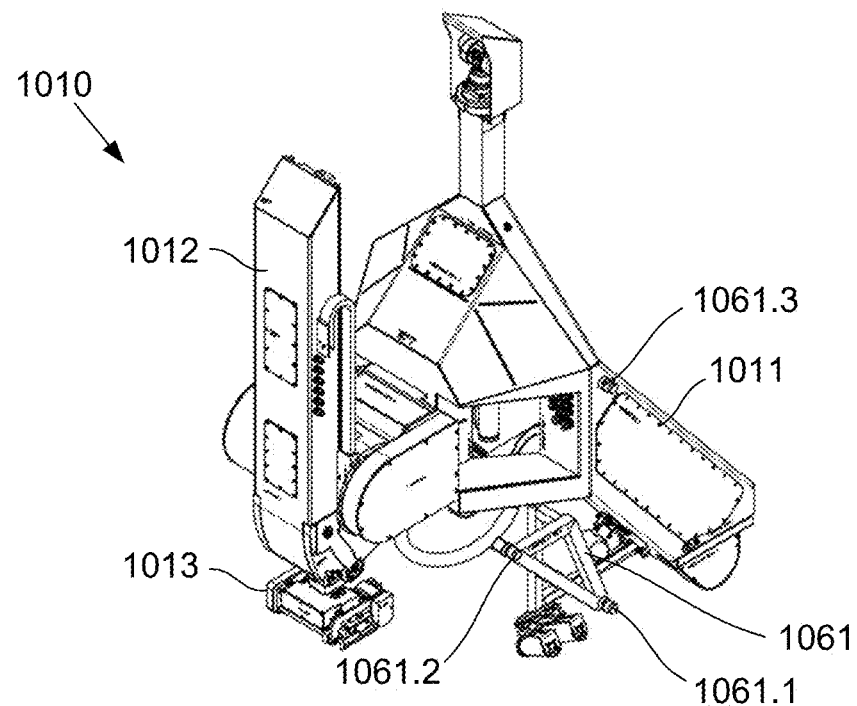
FIG. 10A is a perspective view of a further example of a robot base including a target configuration.
Figure 10B:
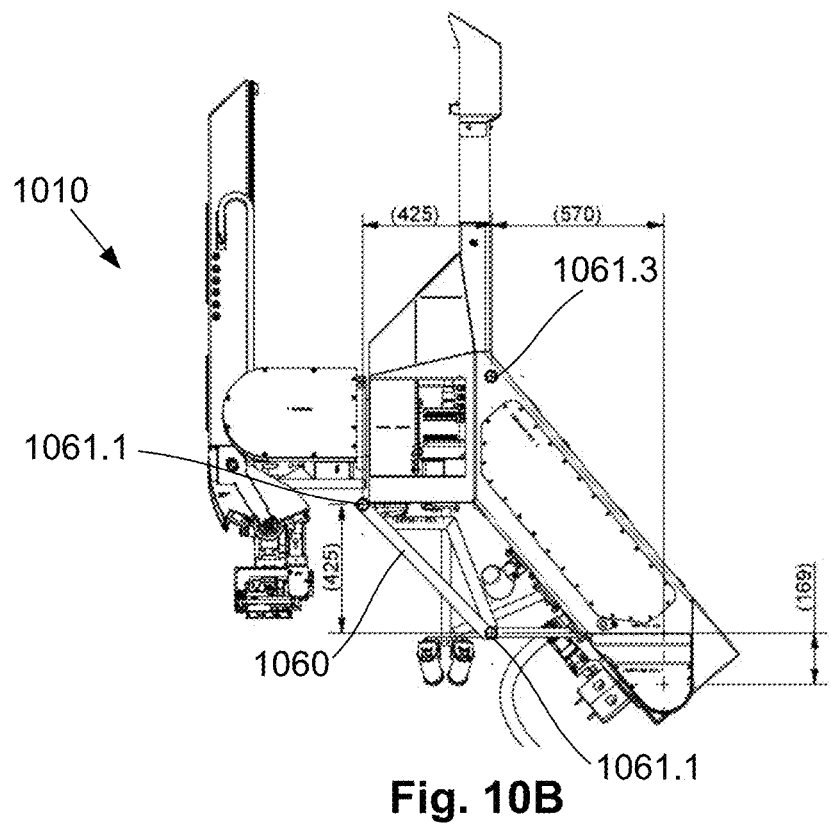
FIG. 10B is a side view of the robot base of FIG. 10A.

In this example, there is provided a block laying and adhesive applying head 1010 that is mounted at the end of boom 1102 which is in turn mounted to a truck 1101. The block laying and adhesive applying head 1010 forms part of a robotic block laying machine 1100. The block laying and adhesive applying head 1010 includes a robotic arm 1012 and end effector 1013 mounted to a robot base 1011 which attaches to the boom 1102. A rigid target support 1060 is mounted to the side of the head 1010 proximate the robot base 1011. Two targets (e.g. SMRs) 1061.1, 1061.2 are affixed to apexes of the support 1061 as shown in FIGS. 10A and 10B. A third target (e.g. SMR) 1061.3 is affixed to a part of the robot base 1011. Together the three targets define a triangle and are disposed in a plane. The indicative spacing of the targets is shown in FIG. 10B ranging from around 600-825 mm.

Figure 11A:
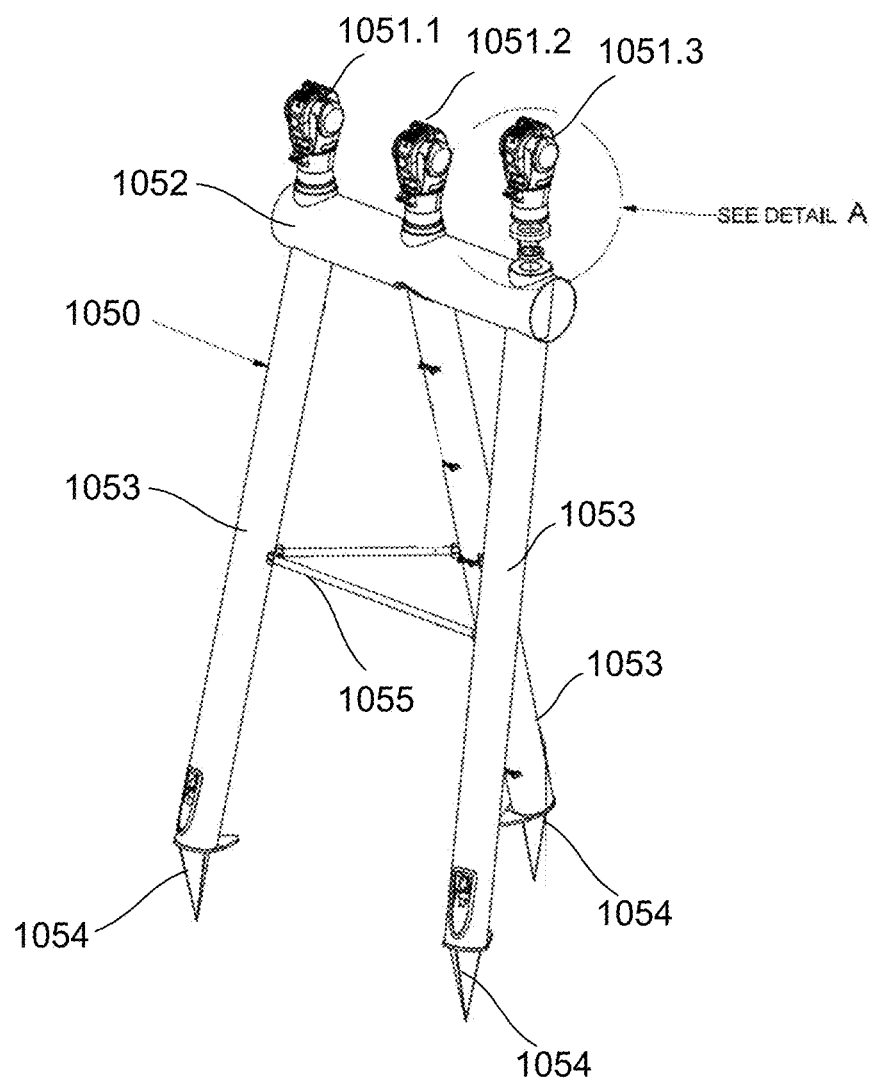
FIG. 11A is a perspective view of a further example of a tracking base.
Figure 11B:
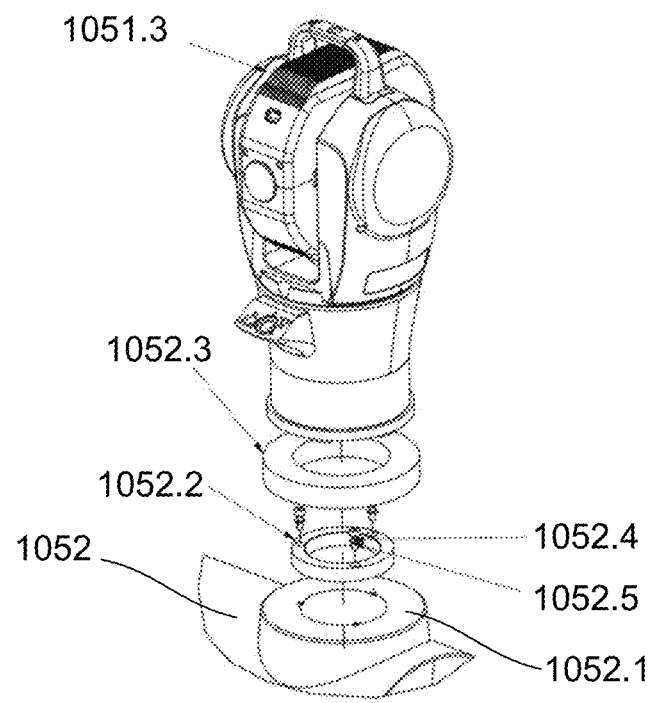
FIG. 11B is an exploded perspective view of a tracking head mount as shown in Detail A of FIG. 11A.
Figure 11C:
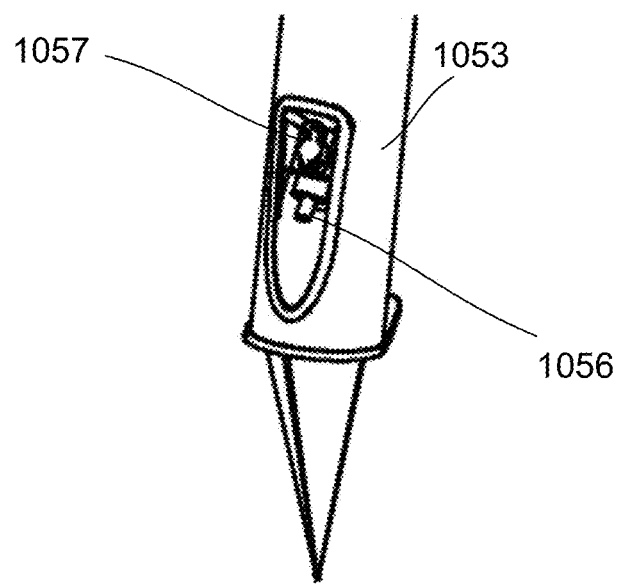
FIG. 11C is a close up view of a leg of the tracking base showing a hose connector and valve arrangement; and, FIG. 12 is a schematic plan view of a robotic block laying system including a block laying machine and a tracking system.

The tracking base 1050 is shown in FIGS. 11A to 11C. In this example, the tracking base 1050 includes three tracking heads 1051.1, 1051.2, 1051.3 (such as API Radian laser trackers) that are mounted to a platform or support 1052 which is an elongate tubular structure disposed horizontally relative to a floor or slab surface. The tracking heads 1051.1, 1051.2, 1051.3 are spaced approximately 500 mm apart and are disposed along a common axis. As shown in FIG. 11B, the tracking head 1051.3 is mounted to a platform mount 1052.1 via inner and outer rings 1052.2 and 1052.3. The inner ring 1052.2 is mounted to the platform via screws and washers 1052.4, 1052.5.

Three elongate tubular legs 1053 downwardly depend from the platform 1052 in a tripod configuration. A pair of outer legs 1053 are bonded to the platform 1052 and a third inner leg 1053 is rotatably mounted to the platform 1052 permitting the tracking base 1050 to fold into a substantially planar configuration for transport. The tubular legs include a hose fitting 1056 and valve 1057 operable to allow each leg 1053 to be at least partially filled with water as shown in FIG. 11C. This provides further stability to the structure as well as providing a cooling system to control thermal expansion of the structure. The legs each terminate in a ground engaging spike 1054.

The legs 1052 and platform 1052 are typically made from carbon fibre which provides excellent stiffness, weight and thermal expansion properties, although other similar materials may be used. The tracking base is approximately 2.9 m high so as to provide line of sight between the tracking heads and targets through the build envelope.

Figure 12:
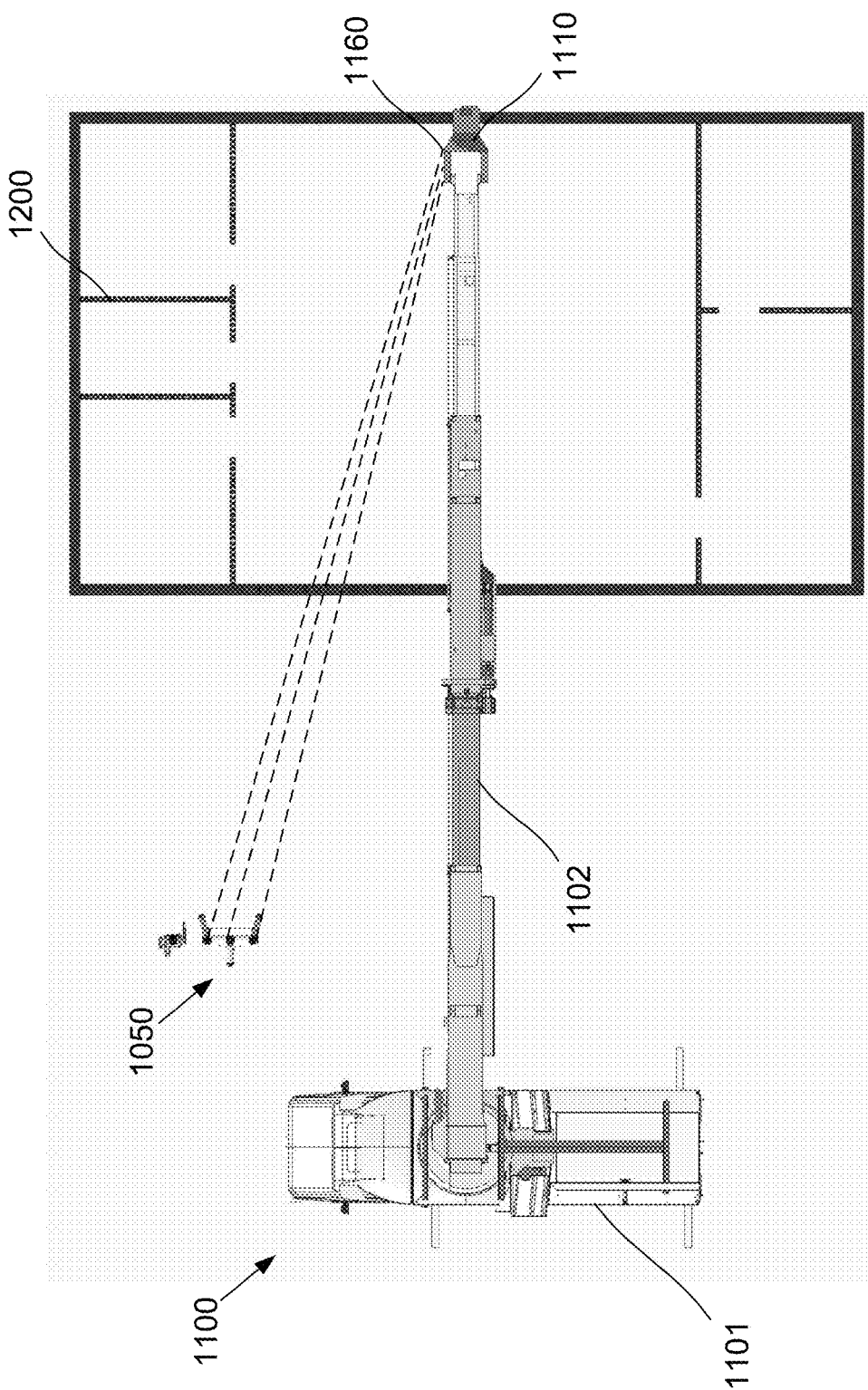

An example layout of the tracking system is shown in FIG. 12 in which the tracking base 1050 is provided close to the slewing axis of the boom 1102 which assists in maintaining line of sight to the target system 1060 as the block laying and adhesive applying head 1110 moves through the build envelope required to construct the house 1200.

The above described system can be used in a wide variety of applications, including but not limited to construction, ship transfer, long building, long trenching, ground contouring, mining, dredging, elevated work platforms, cable suspended robots, very accurate applications, construction of multi-story and/or high-rise buildings, or the like.

Further details of the applicants technology are described in patent publications and co-pending applications U.S. Pat. No. 8,166,727, PCT/AU2008/001274, PCT/AU2008/001275, PCT/AU2017/050731, PCT/AU2017/050730, PCT/AU2017/050728, PCT/AU2017/050739, PCT/AU2017/050738, PCT/AU2018/050698, AU2017902625, AU2017903310, AU2017903312, AU2017904002, AU2017904110, PCT/AU2018/050698, AU2018902566, AU2018902557, PCT/AU2018/050733, PCT/AU2018/050734, PCT/AU2018/050740, PCT/AU2018/050737 and PCT/AU2018/050739, the contents of which are incorporated herein by cross reference.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A tracking system for tracking a position and orientation of an object, the tracking system including:
   a) a tracking base provided in an environment, the tracking base including:
      i) a tracking head support including a platform; and,
      ii) at least three tracking heads rigidly mounted to the platform, each tracking head having:
         (1) a radiation source arranged to send a radiation beam to a respective target;
         (2) a base sensor that senses reflected radiation;
         (3) at least one tracking head actuator that controls an orientation of the tracking head; and,
         (4) at least one tracking head angle sensor that monitors an orientation of the tracking head;
   b) a target system including at least three targets mounted to the object, each target including a reflector that reflects the radiation beam to the base sensor of a respective tracking head; and,
   c) a control system that:
      i) causes each tracking head to track a respective target as it moves throughout the environment;
      ii) determines a position of each target with respect to a respective tracking head at least in part using signals from:
         (1) each base sensor; and,
         (2) the at least one tracking head angle sensor;
      iii) calculates an orientation of the target system using the determined position of each target; and,
      iv) determines the position and orientation of the object using at least in part the position and orientation of the target system.

2. The tracking system according to claim 1, wherein at least one of:
   a) the position of each target is determined using a distance measurement obtained from the base sensor and elevation and azimuth angles obtained from the at least one tracking head angle sensor;
   b) signals from a base sensor of a respective tracking head are used to control the at least one tracking head actuator to ensure that the tracking head tracks the target as it moves throughout the environment;
   c) each tracking head is calibrated relative to the environment coordinate system such that the control system transforms positional data from each tracking head directly into the environment coordinate system;
   d) the control system compares the determined position and orientation of the object with a desired position and orientation of the object and calculates a compensation vector in accordance with results of the comparison; and
   e) each target is mounted to a pan and/or tilt controlled mount operable to assist the targets in maintaining line of sight with the tracking heads.

3. The tracking system according to claim 2, wherein the position of each target is relative to a local coordinate system of the respective tracking head.

4. The tracking system according to claim 2, wherein a first tracking head defines a tracking base coordinate system and the position measurements of at least second and third tracking heads are transformed into the tracking base coordinate system using tracker calibration data.

5. The tracking system according to claim 4, wherein at least one of:
   a) the tracker calibration data defines the geometric relationship between the local coordinate systems of each respective tracking head; and,
   b) the control system determines the position of each target in an environment coordinate system using environment calibration data.

6. The tracking system according to claim 5, wherein the environment calibration data defines the geometric relationship between the tracking base coordinate system and the environment coordinate system.

7. The tracking system according to claim 6, wherein at least one of:
   a) the position of each target in the environment coordinate system is used to define position vectors and a vector cross product is calculated to define a normal vector to a plane of the target system which defines the orientation of the target system in the environment coordinate system; and
   b) the position and orientation of the target system is transformed into the position and orientation of the object using target system calibration data which defines the geometric relationship between the target system and the object.

8. The tracking system according to claim 1, wherein at least one of:
   a) the at least three tracking heads are spaced apart by at least one of:
      i) 100 mm to 1000 mm;
      ii) 250 mm to 750 mm; and,
      iii) about 500 mm; and, b) the at least three targets are spaced apart by at least one of:
   i) 100 mm to 1000 mm;
   ii) 250 mm to 750 mm; and,
   iii) about 500 mm;
c) the at least three targets are mounted on at least one of:
   i) a target support; and,
   ii) directly on the object;
d) the position of the multiple targets relative to the object is fixed;
e) the targets are rigidly mounted to the object and wherein the control system selectively switches tracking of targets to maintain line of sight between the tracking heads and targets;
f) each target is a spherically mounted retroreflector (SMR); and,
g) the tracking head support:
   i) includes an active cooling system; and/or
   ii) is at least partially made of a material having a low thermal expansion coefficient; and/or
   iii) is coated in a heat resistant or heat reflective coating.

9. The tracking system according to claim 8, wherein at least one of:
a) the target support is at least one of:
   i) rotatably mounted to the object; and,
   ii) fixed relative to the object;
b) the at least three targets are mounted in a plane and spaced apart in two dimensions to thereby form a triangular target array;
c) the target support includes a triangular frame, with a target mounted proximate each apex; and
d) the selective switching of targets ensures that at least three targets are continuously tracked by the tracking heads.

10. The tracking system according to claim 1, wherein at least one of:
a) the multiple tracking heads are mounted in a co-linear arrangement on the platform;
b) the tracking base includes a number of legs that support the platform in an elevated position relative to the environment;
c) the platform has an elongate tubular structure and three elongate tubular legs downwardly depend therefrom in a tripod configuration; and,
d) under wind loading of up to 5 m/s the platform undergoes a rotation that is at least one of:
   i) less than ±0.01°;
   ii) less than ±0.05°; and,
   iii) less than ±0.001°.

11. The tracking system according to claim 10, wherein at least one of:
a) the platform is elevated to a height that is at least one of:
   i) 2 m to 4 m;
   ii) 2 m to 3 m; and,
   iii) at least 2.5 m; and
b) a pair of outer legs are bonded to the platform and a third inner leg is rotatably mounted to the platform permitting the tracking base to fold into a substantially planar configuration for transport.

12. The tracking system according to claim 11, wherein the tubular legs include a hose fitting and valve operable to allow each leg to be at least partially filled with water; optionally, the legs terminate in a ground engaging spike.

13. The tracking system according to claim 1, wherein the object is a robot base having a robot arm and end effector mounted thereon configured to perform an interaction in the environment, wherein the robot base undergoes movement relative to the environment and the tracking system measures a robot base position and determines an orientation of the robot base relative to the environment.

14. The tracking system according to claim 13, wherein at least one of:
a) the robot base includes a head mounted to a boom; and,
b) the tracking system is used for tracking the position and orientation of a brick laying head of a robotic brick laying machine.

15. The tracking system according to claim 14, wherein the boom is attached to a vehicle.

16. The tracking system according to claim 14, wherein the brick laying head is programmed to construct the brick walls of a house on a building slab.

17. The tracking system according to claim 16, wherein the environment is a building site and an environment coordinate system is defined as a building slab coordinate system.

18. A robotic block laying system, including:
a) a block laying robot including:
   i) a truck base;
   ii) a telescopingly extendable and foldable boom mounted to the truck base;
   iii) a block laying and adhesive applying head mounted at the end of the boom for receiving blocks transported along the boom from the truck base and laying blocks in a predetermined position; and,
b) a tracking base provided in an environment, the tracking base including:
   i) a tracking head support including a platform; and,
   ii) at least three tracking heads rigidly mounted to the platform, each tracking head having:
      (1) a radiation source arranged to send a radiation beam to a respective target;
      (2) a base sensor that senses reflected radiation;
      (3) at least one tracking head actuator that controls an orientation of the tracking head; and,
      (4) at least one tracking head angle sensor that monitors an orientation of the tracking head;
c) a target system including at least three targets mounted to the block laying and adhesive applying head, each target including a reflector that reflects the radiation beam to the base sensor of a respective tracking head; and,
d) a control system that:
   i) causes each tracking head to track a respective target as it moves throughout the environment;
   ii) determines a position of each target with respect to a respective tracking head at least in part using signals from:
      (1) each base sensor; and,
      (2) the at least one tracking head angle sensor;
   iii) calculates an orientation of the target system using the determined position of each target; and,
   iv) determines the position and orientation of the brick laying and adhesive applying head using at least in part the position and orientation of the target system.

19. The system according to claim 18, wherein the determined position and orientation of the block laying and adhesive applying head is compared to a desired position and orientation of the block laying and adhesive applying head and a compensation vector is calculated using results of the comparison.

* * * * *